(12) United States Patent
Niki

(10) Patent No.: US 10,137,963 B2
(45) Date of Patent: Nov. 27, 2018

(54) BICYCLE TRANSMISSION

(71) Applicant: Shimano Inc., Sakai, Osaka (JP)

(72) Inventor: Kazutaka Niki, Osaka (JP)

(73) Assignee: Shimano Inc., Osaka (JP)

( * ) Notice: Subject to any disclaimer, the term of this patent is extended or adjusted under 35 U.S.C. 154(b) by 319 days.

(21) Appl. No.: 15/144,878

(22) Filed: May 3, 2016

(65) Prior Publication Data

US 2016/0347414 A1    Dec. 1, 2016

(30) Foreign Application Priority Data

May 29, 2015  (JP) .................................. 2015-110715

(51) Int. Cl.
*F16D 21/08*     (2006.01)
*B62M 11/16*    (2006.01)
*B62M 11/06*    (2006.01)

(52) U.S. Cl.
CPC ............. *B62M 11/16* (2013.01); *B62M 11/06* (2013.01); *F16D 21/08* (2013.01)

(58) Field of Classification Search
CPC .............................. B62M 11/16; B62M 11/06; B62M 2700/001; F16D 21/08; F16H 2037/047; F16H 2037/048
See application file for complete search history.

(56) References Cited

U.S. PATENT DOCUMENTS 5,667,233 A      9/1997  Metzinger
5,855,530 A *   1/1999  Huang ................... B62M 11/18
                                                              475/288
8,608,610 B2   12/2013  Schmitz et al.

FOREIGN PATENT DOCUMENTS

JP       2011 162184 A     8/2011
JP         5105562 B2    12/2012

* cited by examiner

*Primary Examiner* — Mark J Beauchaine
(74) *Attorney, Agent, or Firm* — Global IP Counselors, LLP

(57) ABSTRACT

A bicycle transmission is basically provided with an input gear a plurality of second rotating bodies, a second shaft and a clutch mechanism. The input gear receives a drive force. The rotation of the input gear is transmitted the second rotating bodies. The second shaft is coaxially provided with a plurality of second rotating bodies and rotatably supports the second rotating bodies. The clutch mechanism is provided with a control shaft disposed inside the second shaft and which is rotatable relative to the second shaft. The clutch mechanism switches the coupling state between the second rotating bodies and the second shaft by rotating the control shaft relative to the second shaft. The clutch mechanism rotates the control shaft by transmitting the drive force that is applied to the input gear to the control shaft.

18 Claims, 15 Drawing Sheets

| Stage | Input Side | | Output Side | | |
|---|---|---|---|---|---|
| | First Engagement Part | Second Engagement Part | Third Engagement Part | Fourth Engagement Part | Fifth Engagement Part |
| 1 | up | down | up | down | down |
| 2 | up | down | up (or down) | up | down |
| 3 | up | down | up (or down) | down | up |
| 4 | up (or down) | up | up | down | down |
| 5 | up (or down) | up | up (or down) | up | down |
| 6 | up (or down) | up | up (or down) | down | up |

BICYCLE TRANSMISSION

CROSS-REFERENCE TO RELATED APPLICATIONS

This application claims priority to Japanese Patent Application No. 2015-110715, filed on May 29, 2015. The entire disclosure of Japanese Patent Application No. 2015-110715 is hereby incorporated herein by reference.

BACKGROUND

Field of the Invention

The present invention generally relates to a transmission mounted on a bicycle.

Background Information

Japanese Laid-Open Patent Publication No. 2011-162184 discloses an example of a transmission comprising a hub shaft, a transmission gear which is supported by the hub shaft, multiple pawls attached to the hub shaft, and a control ring that selectively raises multiple pawls to cause the same to mesh with the transmission gear. The control ring is rotated by being pulled by a wire when a driver operates a shift lever, and raises one pawl from among multiple pawls from the hub shaft.

SUMMARY

Generally, the present disclosure is directed to various features of a bicycle transmission.

In view of the state of the known technology and in accordance with a first aspect of the present disclosure, a bicycle transmission comprises an input rotating body, a plurality of rotating bodies, a hollow shaft and a clutch mechanism. The input rotating body to which a drive force is inputted. The rotating bodies to which are transmitted rotation of the input rotating body. The hollow shaft is provided coaxially with the rotating bodies and rotatably supports the rotating bodies. The clutch mechanism includes with a control shaft disposed inside the hollow shaft and is rotatably arranged relative to the hollow shaft, and configured to switch a coupling state between the rotating bodies and the hollow shaft by rotating the control shaft relative to the hollow shaft. The clutch mechanism is configured to rotate the control shaft by transmitting a drive force that is applied to the input rotating body to the control shaft.

In accordance with a second aspect of the present invention, the transmission is configured so that the clutch mechanism comprises a speed increasing mechanism configured to increases a speed of rotation of the hollow shaft and providing the same to the control shaft, and a speed reducing mechanism configured to reduce the speed of the rotation of the hollow shaft and providing the same to the control shaft.

In accordance with a third aspect of the present invention, the transmission is configured so that the input rotating body comprises an input gear, and the rotating bodies comprise an input side gear which meshes with the input rotating body.

In accordance with a fourth aspect of the present invention, the transmission further comprises a first shaft separated from the hollow shaft, and an output rotating body, to which is transmitted rotation from the rotating bodies, and which outputs the rotation. The input rotating body and the output rotating body are rotatably disposed about an axis of the first shaft.

In accordance with a fifth aspect of the present invention, the transmission is configured so that the output rotating body comprises an output gear, and the rotating bodies comprise an output side gear which meshes with the output rotating body.

In accordance with a sixth aspect of the present invention, the transmission is configured so that at least one of the input gear and the output gear comprises a plurality of gears having different diameters.

In accordance with a seventh aspect of the present invention; the transmission is configured so the rotating bodies comprise a plurality of input side gears which mesh with each of the plurality of gears of the input gear.

In accordance with an eighth aspect of the present invention, the transmission is configured so that the rotating bodies comprise a plurality of output side gears which mesh with each of the plurality of gears of the output gear.

In accordance with a ninth aspect of the present invention, the transmission is configured so that the clutch mechanism further comprises a plurality of engagement portions that are operated by rotation of the control shaft, and that selectively transmit rotation of one of the input side gears to the hollow shaft.

In accordance with a tenth aspect of the present invention, the transmission is configured so that the clutch mechanism further comprises a plurality of engagement portions that are operated by rotation of the control shaft, and that selectively transmit rotation of the hollow shaft to one of the output side gears.

In accordance with an eleventh aspect of the present invention, the transmission is configured so that the rotating bodies comprise a plurality of input side gears which mesh with each of the plurality of gears of the input gear; and the clutch mechanism further comprises a plurality of engagement portions that are operated by rotation of the control shaft, that selectively transmit rotation of one of the input side gears to the hollow shaft, and that selectively transmit rotation of the hollow shaft to one of the output side gears.

In accordance with a twelfth aspect of the present invention, the transmission is configured so that an opening is formed on the outer peripheral portion of the hollow shaft, at least one engagement portion of the engagement portions is disposed in the opening, the control shaft comprises a control portion for controlling the engagement portion which is disposed in the opening, and switches between a first state in which the engagement portion protrudes from the opening and a second state in which the engagement portion retracts into the opening, by rotating the control shaft with respect to the hollow shaft.

In accordance with a thirteenth aspect of the present invention, the transmission is configured so that the clutch mechanism further comprises an elastic member for biasing the engagement portion to protrude from the opening.

In accordance with a fourteenth aspect of the present invention, the transmission is configured so that the speed increasing mechanism comprises a first synchronizing gear which is integrally rotated with the hollow shaft, a second synchronizing gear which is integrally rotatable with the control shaft, a first auxiliary gear which can mesh with one of the first synchronizing gear and the second synchronizing gear, a second auxiliary gear which meshes with the other of the first synchronizing gear and the second synchronizing gear and is integrally rotated with the first auxiliary gear, and a first switching unit which switches between a state in which the first auxiliary gear meshes with one of the first synchronizing gear and the second synchronizing gear, and a state in which the first auxiliary gear does not mesh with one of the first synchronizing gear and the second synchronizing gear.

In accordance with a fifteenth aspect of the present invention, the transmission is configured so that the speed decreasing mechanism comprises the first synchronizing gear, a third synchronizing gear which can be integrally rotated with the control shaft and which has fewer number of teeth than the second synchronizing gear, a third auxiliary gear which can mesh with one of the first synchronizing gear and the third synchronizing gear, a fourth auxiliary gear which meshes with the other of the first synchronizing gear and the third synchronizing gear and which is integrally rotated with the second auxiliary gear, and a second switching unit which switches between a state in which the third auxiliary gear meshes with one of the first synchronizing gear and the third synchronizing gear, and a state in which the third auxiliary gear does not mesh with one of the first synchronizing gear and the third synchronizing gear.

In accordance with a sixteenth aspect of the present invention, the transmission is configured so that the first auxiliary gear comprises a toothless portion in which teeth are not present in a portion of the outer periphery of the first auxiliary gear, and the first switching unit comprises a first key member provided to the first auxiliary gear and an actuator for operating the first key member. The first key member is provided protruding from the toothless portion so as to be movable between a protruding position in contact with one of the first synchronizing gear and the second synchronizing gear and a retracted position not in contact with one of the first synchronizing gear and the second synchronizing gear. The actuator moves the first key member from the retracted position to the protruding position In accordance with a seventeenth aspect of the present invention, the transmission is configured so that the first switching unit comprises a guide portion that moves the first key member from the protruding position to the retracted position when the first synchronizing gear is rotated.

In accordance with an eighteenth aspect of the present invention, the transmission is configured so that the third auxiliary gear comprises a toothless portion in which teeth are not present in a portion of the outer periphery thereof, the second switching unit comprises a second key member provided to the third auxiliary gear and an actuator, the second key member is provided protruding from the toothless portion so as to be movable between a protruding position in contact with one of the first synchronizing gear and the third synchronizing gear and a retracted position not in contact with one of the first synchronizing gear and the third synchronizing gear, and the actuator moves the second key member from the retracted position to the protruding position.

In accordance with a nineteenth aspect of the present invention, the transmission is configured so that the second switching unit comprises a guide portion that moves the second key member from the protruding position to the retracted position when the third synchronizing gear is rotated.

In accordance with a twentieth aspect of the present invention, a transmission of a bicycle is provided that basically comprises a driver, a transmission unit and a clutch unit. The driver is rotated by a drive force being inputted thereto. The transmission unit is connected to the driver and configured to define a plurality of gear shift stages. The clutch unit selects a power transmission path that corresponds to the gear shift stages of the transmission unit. The clutch unit switches between a first state in which a rotational force of the driver in one direction is transmitted to the transmission unit as a rotational force in a first rotational direction to operate the transmission unit, and a second state in which the rotational force of the driver in the one direction is transmitted to the transmission unit as a rotational force in the opposite rotational direction of the first rotational direction to operate the transmission unit.

In accordance with a twenty-first aspect of the present invention, the transmission is configured so that the clutch unit is capable of switching between the first state, the second state, and a third state in which the rotational force in the one direction of the driver is not transmitted to the transmission unit.

In accordance with a twenty-second aspect of the present invention, the transmission is configured so that the transmission unit comprises a planetary gear mechanism, and the clutch unit controls the rotation state of the sun gear of the planetary gear mechanism.

The transmission described above enhances the shifting performance.

Also other objects, features, aspects and advantages of the disclosed a bicycle transmission will become apparent to those skilled in the art from the following detailed description, which, taken in conjunction with the annexed drawings, discloses one illustrative embodiment of the bicycle transmission.

BRIEF DESCRIPTION OF THE DRAWINGS

Referring now to the attached drawings which form a part of this original disclosure.

DETAILED DESCRIPTION OF EMBODIMENTS

Selected embodiments will now be explained with reference to the drawings. It will be apparent to those skilled in the bicycle field from this disclosure that the following descriptions of the embodiments are provided for illustration only and not for the purpose of limiting the invention as defined by the appended claims and their equivalents.

First Embodiment

Figure 1:
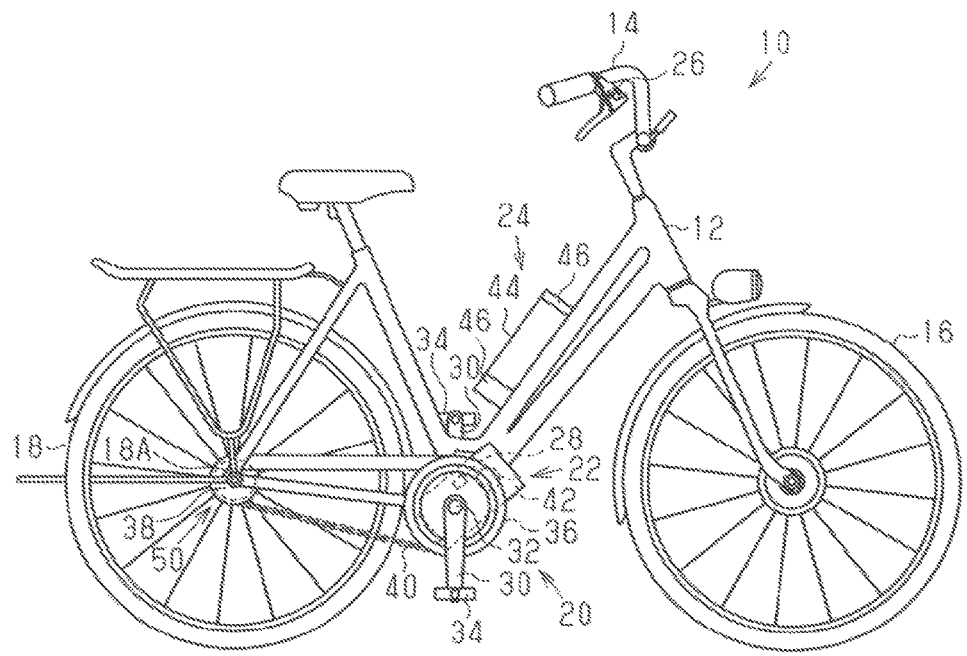
FIG. 1 is a side elevational view of a bicycle equipped with a bicycle transmission of the first embodiment.

FIG. 1 is a side view of a bicycle 10 equipped with a transmission 50 as an internal transmission. The bicycle 10 comprises a frame 12, a handlebar 14, a front wheel 16, a rear wheel 18, a drive mechanism 20, an assist mechanism 22, a battery unit 24, a shift operation device 26, a controller 28 and a transmission 50.

The drive mechanism 20 comprises left and right crank arms 30, a crankshaft 32, left and right pedals 34, a front sprocket 36, a rear sprocket 38, and a chain 40. The left and right crank arms 30 are rotatably attached to the frame 12 via one crankshaft 32. The pedal 34 are attached to the crank arms 30 so as to be rotatable around a pedal shaft of a respective one of the crank arms 30.

The front sprocket 36 is coupled with the crankshaft 32. The front sprocket 36 is provided coaxially with the crankshaft 32. The front sprocket 36 can be coupled so as to not rotate relatively with the crankshaft 32, or be coupled via a one-way clutch (not shown) so that the front sprocket 36 will also rotate in a forward drive direction when the crankshaft 32 rotates the forward drive direction.

The rear sprocket 38 is rotatably attached around an axle 18A of the rear wheel 18. The rear sprocket 38 is coupled to the rear wheel 18 via the transmission 50.

The chain 40 is wound to the front sprocket 36 and the rear sprocket 38. When the crank arms 30 are rotated by the manual drive force which is applied to the pedals 34, the rear wheel 18 is rotated by the front sprocket 36, the chain 40, and the rear sprocket 38.

The assist mechanism 22 comprises an assist motor 42 and a reduction gear (not shown). The assist mechanism 22 assists the manual drive force which rotates the front sprocket 36 with the drive of the assist motor 42. The assist mechanism 22 comprises a sensor (not shown) for detecting the manual drive force which is inputted from the crankshaft 32. The assist mechanism 22 drives the assist motor 42 according to the manual drive force. The assist motor 42 is, for example, an electric motor. The rotation of the assist motor 42 is transmitted to the front sprocket 36 via the reduction gear. A one-way clutch (not shown) can be provided between the assist motor 42 and the front sprocket 36 for preventing the assist motor 42 from being rotated by the manual drive force when the crank arms 30 rotate in the forward drive direction.

The battery unit 24 comprises a battery 44 and a battery holder 46 for detachably attaching the battery 44 to the frame 12. The battery 44 includes one or a plurality of battery cells. The battery 44 is formed of a secondary battery. The battery 44 is electrically connected to the assist motor 42 and an internal transmission 50, and supplies electric power to the assist motor 42 and the internal transmission 50.

The shift operation device 26 comprises, for example, a plurality of buttons, and is electrically connected to the internal transmission 50. The internal transmission 50 switches the gear shift stage by a user operating a button of the shift operation device 26.

The controller 28 drives the assist motor 42, raises the output of the assist motor 42, stops the assist motor 42, or reduces the output of the assist motor 42, based on an operation of an assist operating unit (not shown).

The internal transmission 50 changes the speed of rotation of the rear sprocket 38 (refer to FIG. 1). The transmission 50 is integrated with a hub of an axle 18A of the rear wheel 18 (refer to FIG. 1), and comprises a plurality of gear shift stages.

Figure 2:
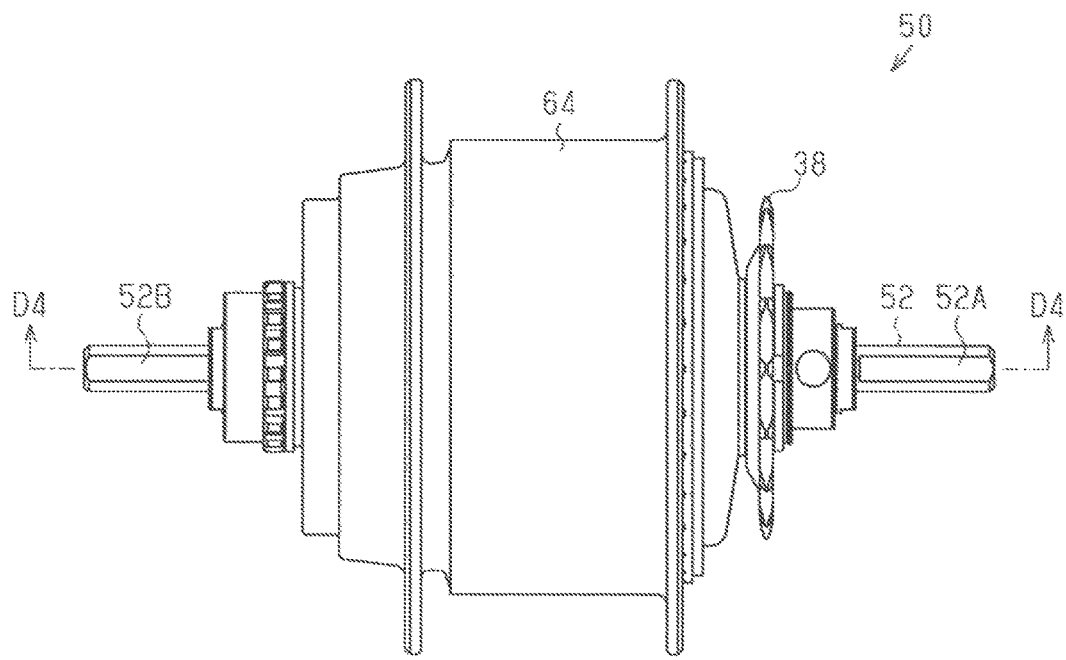
FIG. 2 is a front elevational view of the bicycle transmission illustrated in FIG. 1.
Figure 3:
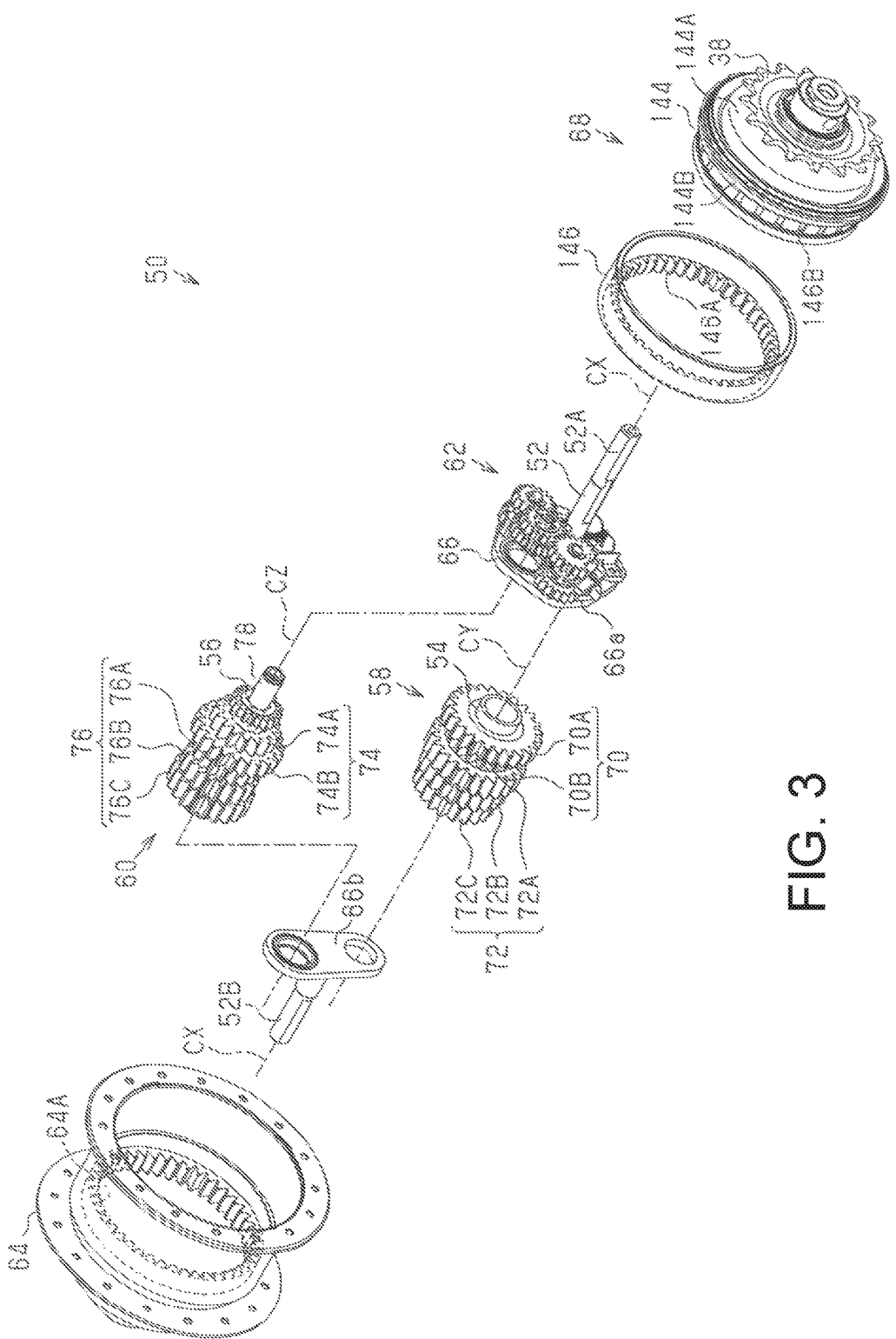
FIG. 3 is an exploded perspective view of the transmission illustrated in FIGS. 1 and 2.

As shown in FIG. 2 or FIG. 3, the internal transmission 50 comprises a hub shaft 52, a first shaft 54, a second shaft 56, a plurality of first rotating bodies 58, a plurality of second rotating bodies 60, a clutch mechanism 62, a hub shell 64, a support member 66, and a drive unit 68. The second shaft 56 corresponds to a "hollow shaft."

Figure 4:
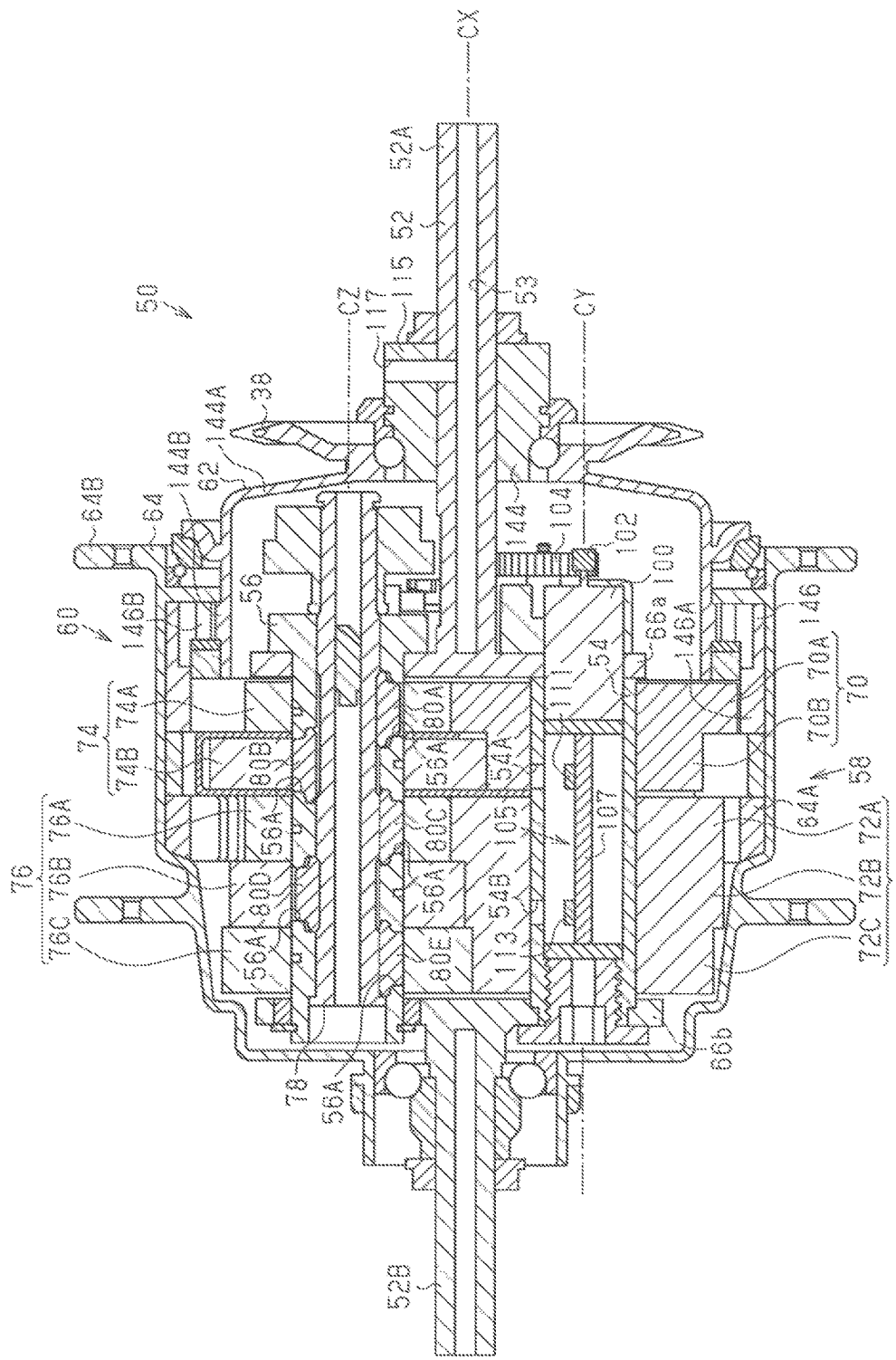
FIG. 4 is a cross-sectional view of the transmission illustrated in FIGS. 1 to 3 as seen along section line D4-D4 of FIG. 2.

The hub shaft 52 shown in FIGS. 2, 3 and 4 can be attached to the frame 12 of the bicycle 10 (refer to FIG. 1). The hub shaft 52 comprises a first hub shaft 52A, and a second hub shaft 52B which is separated from the first hub shaft 52A. The first hub shaft 52A protrudes in one of the axial directions of the hub shell 64. The second hub shaft 52B protrudes in the other axial direction of the hub shell 64.

The first hub shaft 52A and the second hub shaft 52B are coaxial. The support member 66 comprises a support member 66a and a support member 66b. The support member 66a is coupled to the first hub shaft 52A. The support member 66b which is coupled to the second hub shaft 52B. The support members 66a and 66b are provided at an interval in the hub shaft direction. The support member 66a supports the end of the first hub shaft 52A on the side with the second hub shaft 52B. The support member 66b supports the end of the second hub shaft 52B on the side with the first hub shaft 52A. The support member 66a and the support member 66b extend in the radial direction of the hub shaft 52.

The first shaft 54 is provided separated from an axis CX of the hub shaft 52, and is non-rotatable around the axis CX of the huh shaft 52. The first shaft 54 is formed to be hollow. The distance between the hub shaft 52 and the first shaft 54 in the radial direction of the hub shell 64, and the distance between the hub shaft 52 and the second shaft 56 in the radial direction of the hub shell 64, are substantially equal. The two ends of the first shaft 54 are supported by the support members 66a, 66b and fixed to the support members 66a and 66b. The first shaft 54 is non-rotatable around an axis CY of the first shaft 54. The support members 66a and 66b are coupled via the first shaft 54 and the relative movement of the support member 66a and the support member 66b is inhibited. A connecting member can be further provided as well for coupling the support member 66a and the support member 66b.

The second shaft 56 is provided separated from the axis CX of the hub shaft 52 and the axis CY of the first shaft 54. The second shaft 56 is non-rotatable around the axis CX of the hub shaft 52. The second shaft 56 is a hollow shaft which rotatably supports the second rotating bodies 60. The axis CY of the first shaft 54 and an axis CZ of the second shaft 56 are disposed symmetrically with respect to the axis CX of the hub shaft 52. The two ends of the second shaft 56 are supported by the support members 66a, 66b, respectively. The second shaft 56 is rotatable around the axis CZ of the second shaft 56.

The first rotating bodies 58 shown in FIGS. 2 and 3 are provided coaxially with the first shaft 54, and are rotatable around the axis CY of the first shaft 54. The first rotating bodies 58 are rotatably supported to the first shaft 54. The first rotating bodies 58 are disposed between the support member 66a and the support member 66b. The first rotating bodies 58 comprise a plurality of input gears 70 as input rotating bodies to which are inputted a rotation, and a plurality of output gears 72 as output rotating bodies which output the rotation to the hub shell 64. A bearing can be provided between each of the first rotating bodies 58 and the first shaft 54. Each gear used in the transmission 50 of the present embodiment can be formed of metal or can be formed of synthetic resin.

The input gears 70 comprise a first input gear 70A and a second input gear 70B, which have diameters different from each other. The first input gear 70A has a larger diameter than the second input gear 70B. The first input gear 70A has a larger number of teeth than the second input gear 70B. The first input gear 70A and the second input gear 70B are integrally formed. The first input gear 70A is disposed in a position closer to the first hub shaft 52A than the second input gear 70B, in the axial direction of the first shaft 54. The first input gear 70A and the second input gear 70B can be formed in one piece, or, be formed as separate bodies and fixed to each other.

The output gears 72 comprise a first output gear 72A, a second output gear 72B, and a third output gear 72C, which have diameters different from each other. The first output gear 72A has a larger diameter than the second output gear 72B and the third output gear 72C. The second output gear 72B has a larger diameter than the third output gear 72C. The number of teeth becomes greater in the order of the first output gear 72A, the second output gear 72B, and the third output gear 72C. The first output gear 72A, the second output gear 72B, and the third output gear 72C are integrally formed. The first output gear 72A is provided further on the first hub shaft 52A side than the second output gear 72B. The first output gear 72A is disposed between flanges 64B of the hub shell 64 in the hub shaft direction.

The first output gear 72A is disposed in a position closer to the first hub shaft 52A than the second output gear 72B and the third output gear 72C, in the axial direction of the first shaft 54.

The second output gear 72B is disposed in a position closer to the first hub shaft 52A than the third output gear 72C, in the axial direction of the first shaft 54; in other words, disposed between the first output gear 72A and the third output gear 72C, in the axial direction of the first shaft 54. The first output gear 72A, the second output gear 72B, and the third output gear 72C can be formed in one piece, or, be formed as separate bodies and fixed to each other.

The second rotating bodies 60 are provided coaxially with the second shaft 56, and are respectively coupled to the first rotating bodies 58. The second rotating bodies 60 are disposed between the support member 66a and the support member 66b. Multiple second rotating bodies 60 are rotatable around the axis CZ of the second shaft 56. The second rotating bodies 60 comprise a plurality of input side gears 74 which respectively mesh with the input gears 70, and a plurality of output side gears 76 which respectively mesh with the output gears 72.

The input side gears 74 comprise a first input side gear 74A and a second input side gear 74B, which have diameters different from each other.

The first input side gear 74A has a smaller diameter than the second input side gear 74B. The first input side gear 74A has a smaller number of teeth than the second input side gear 74B. The first input side gear 74A is disposed in a position closer to the first hub shaft 52A than the second input side gear 74B, in the axial direction of the first shaft 54. The first input side gear 74A meshes with the first input gear 70A. The second input side gear 74B meshes with the second input gear 70B.

The output side gears 76 comprise a first output side gear 76A, a second output side gear 76B, and a third output side gear 76C, which have diameters different from each other.

The first output side gear 76A has a smaller diameter than the second output side gear 76B and the third output side gear 76C. The second output side gear 76B has a smaller diameter than the third output side gear 76C. The number of teeth becomes smaller in the order of the first output side gear 76A, the second output side gear 76B, and the third output side gear 76C.

The first output side gear 76A is disposed in a position closer to the first hub shaft 52A than the second output side gear 76B and the third output side gear 76C, in the axial direction of the first shaft 54. The second output side gear 76B is disposed in a position closer to the first hub shaft 52A than the third output side gear 76C, in the axial direction of the first shaft 54. In other words, the second output side gear 76B is disposed between the first output side gear 76A and the third output side gear 76C, in the axial direction of the first shaft 54. The first output side gear 76A meshes with the first output gear 72A. The second output side gear 76B meshes with the second output gear 72B. The third output side gear 76C meshes with the third output gear 72C.

Figure 5:
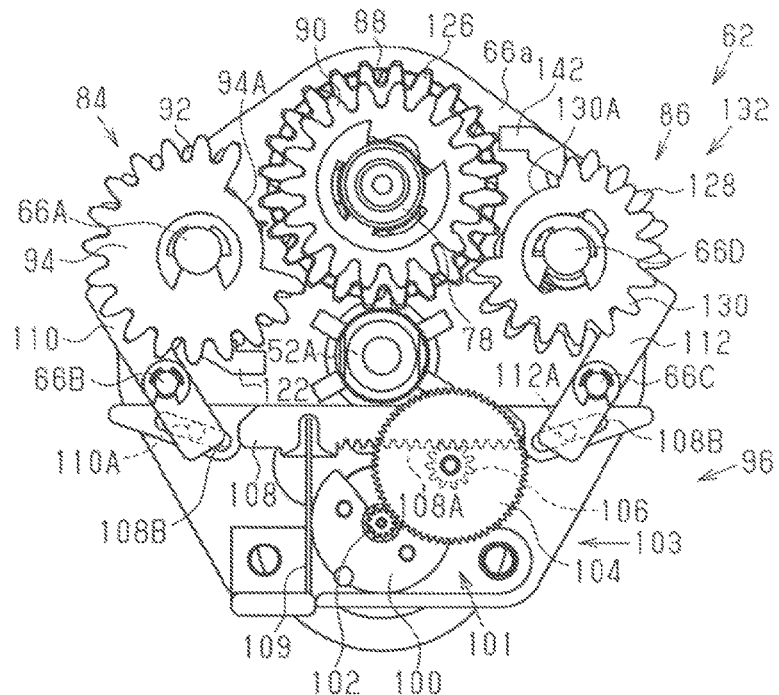
FIG. 5 is a front elevational view of the clutch mechanism of the transmission illustrated in FIGS. 1 to 4.
Figure 6:
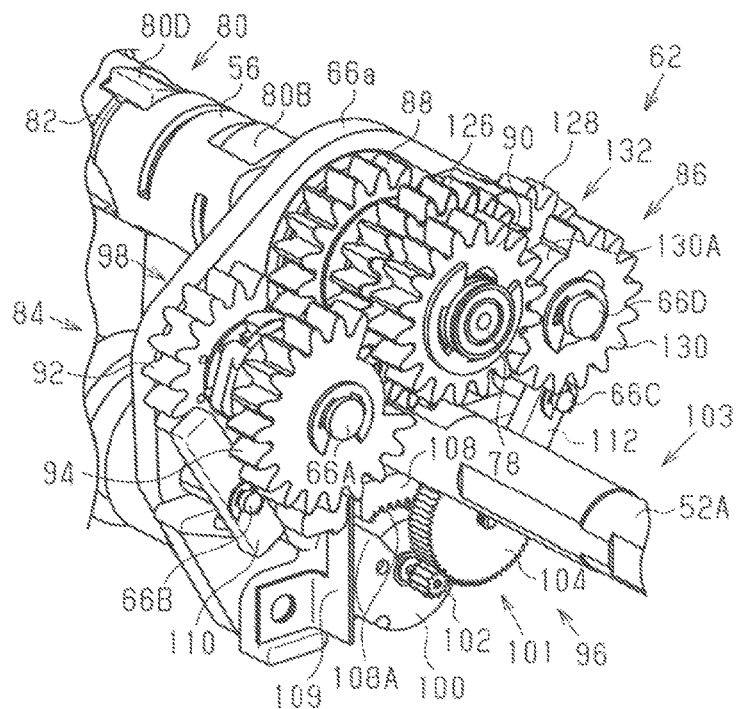
FIG. 6 is a perspective view of the clutch mechanism illustrated in FIG. 5.

The clutch mechanism 62 shown in FIGS. 5 and 6 controls the rotation state of the second rotating body 60 around the axis CZ of the second shaft 56. The clutch mechanism 62 includes a control shaft 78, a plurality of engagement parts 80, a plurality of springs 82, a speed increasing mechanism 84, and a speed reducing mechanism 86.

Figure 9:
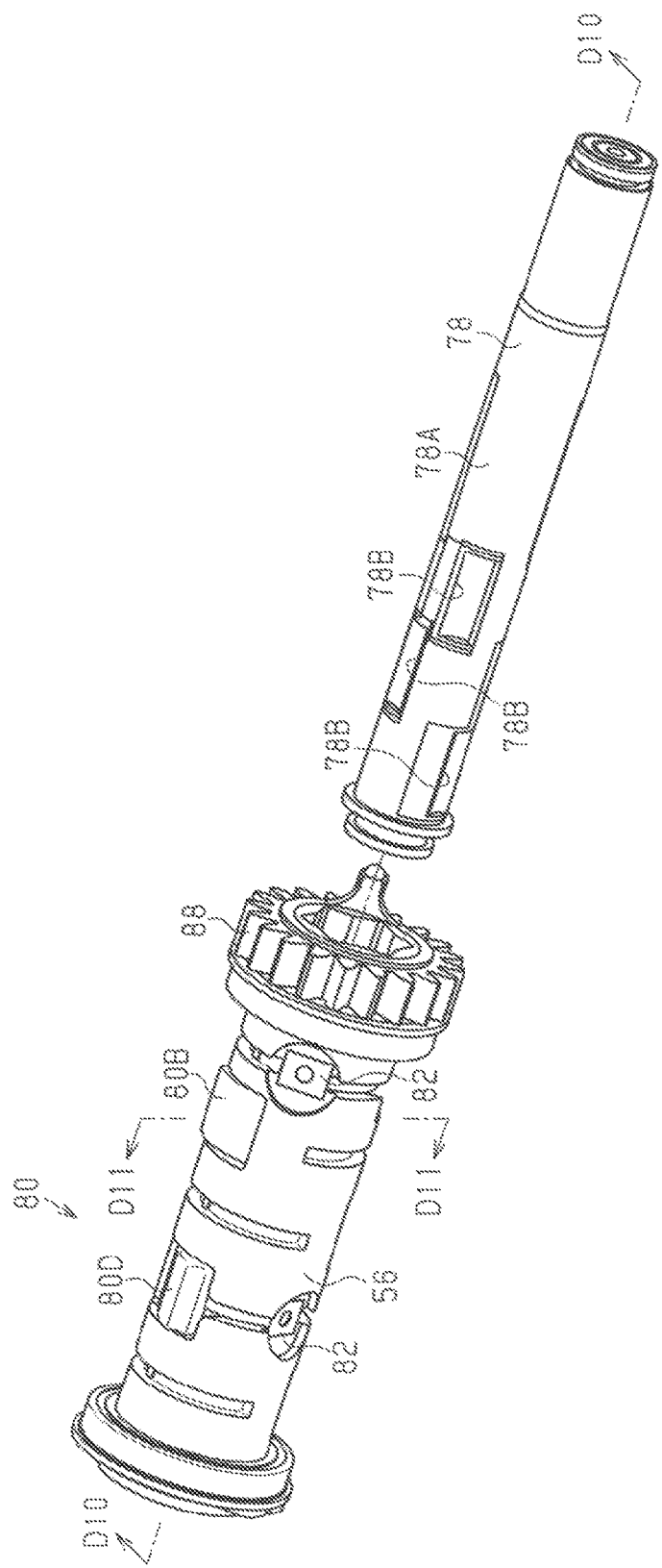
FIG. 9 is an exploded perspective view of the second shaft and the control shaft of the transmission illustrated in FIGS. 1 to 4.
Figure 10:
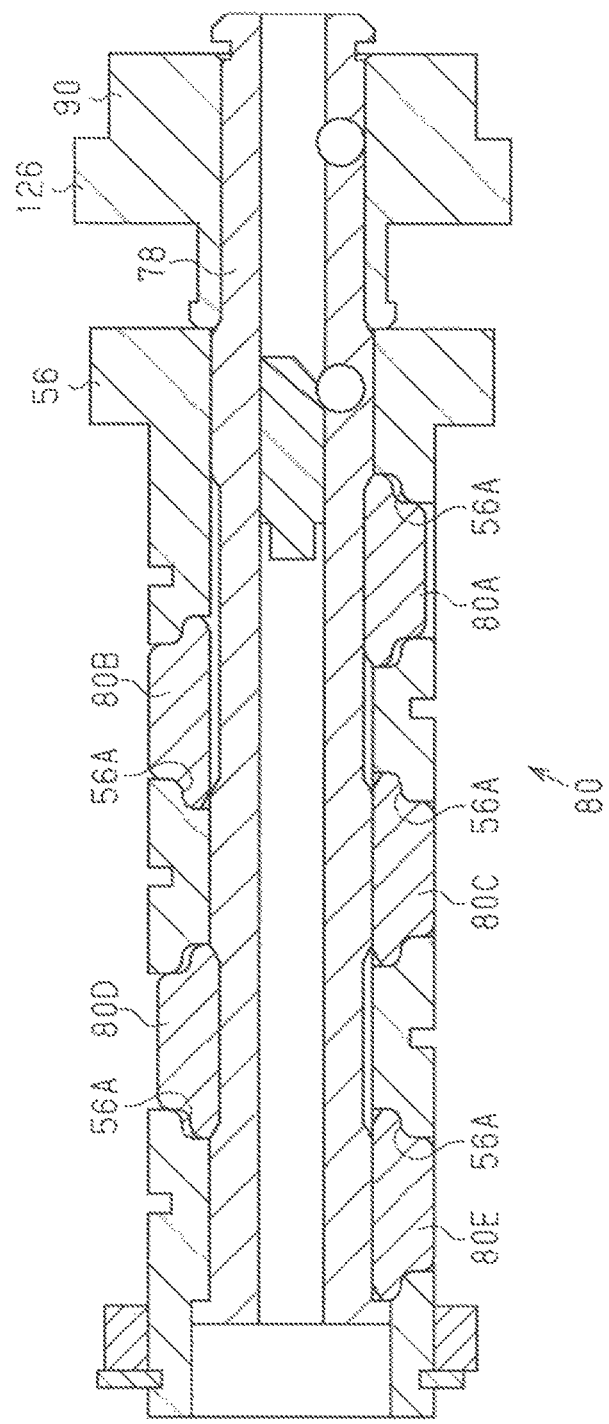
FIG. 10 is a cross-sectional view of the second shaft and the control shaft as seen along section line D10-D10 of FIG. 9 in a state in which the control shaft is housed in the second shaft.

The control shaft 78 shown in FIGS. 9 and 10 is disposed in the hollow second shaft 56 and is rotatably arranged relative to the second shaft 56. The control shaft 78 is provided coaxially with the second shaft 56, and can be rotated with the second shaft 56. At least a portion of the control shaft 78 in the axial direction is disposed in the hollow second shaft 56. The control shaft 78 comprises a first control portion 78A and a second control portion 78B, which control the engagement part 80. The first control portion 78A is a portion of a cylindrical outer periphery surface of the control shaft 78. The second control portion 78B is a recess formed on the outer periphery surface of the control shaft 78. The second control portion 78B is provided in a position corresponding to the engagement part 80 in the axial direction of the second shaft 56.

The engagement parts 80 shown in FIGS. 9 and 10 are pawl-shaped members. The engagement part 80 selectively transmits the rotation of either the first input side gear 74A or the second input side gear 74B to the second shaft 56. The engagement part 80 selectively transmits the rotation of the second shaft 56 to one of the first output side gear 76A, the second output side gear 76B, and the third output side gear 76C.

The engagement parts 80 comprise a first engagement part 80A, a second engagement part 80B, a third engagement part 80C, a fourth engagement part 80D, and a fifth engagement part 80E, which are disposed side-by-side in the axial direction of the second shaft 56 and the control shaft 78. The engagement parts 80 are respectively disposed in openings 56A, which are formed on the outer peripheral portion of the second shaft 56. Each of the openings 56A extends through the outer peripheral portion and the inner perimeter portion of the second shaft 56. Each of the openings 56A is provided in a position corresponding to each of the first input side gear 74A, the second input side gear 74B, the first output side gear 76A, the second output side gear 76B, and the third output side gear 76C, in the axial direction of the second shaft 56. Each of the openings 56A which are adjacent to each other in the axial direction of the second shaft 56 is preferably formed spaced apart in the circumferential direction of the second shaft 56.

As shown in FIG. 4, among the openings 56A, the first engagement part 80A is disposed in the opening 56A which is present on the inner perimeter side of the first input side gear 74A. Among the openings 56A, the second engagement part 80B is disposed in the opening 56A which is present on the inner perimeter side of the second input side gear 74B. Among the openings 56A, the third engagement part 80C is disposed in the opening 56A which is present on the inner perimeter side of the first output side gear 76A. Among the openings 56A, the fourth engagement part 80D is disposed in the opening 56A which is present on the inner perimeter side of the second output side gear 76B. Among the openings 56A, the fifth engagement part 80E is disposed in the opening 56A which is present on the inner perimeter side of the third output side gear 76C.

As shown in FIG. 9, the distal ends of the engagement parts 80 are biased to protrude from the openings 56A, by a plurality of springs 82 as elastic members which are attached to the outer periphery of the second shaft 56. An engaged portion 75 (refer to FIGS. 11A and 11B) which can engage with the engagement part 80 is formed on the inner perimeter portion of the input side gears 74 and the inner perimeter portion of the output side gears 76. The engaged portion 75 comprises at least one recess or protrusion. In the present embodiment, the engaged portion 75 is configured so that recesses and protrusions are arranged alternately in the circumferential direction. The engaged portion 75 can be formed of ratchet teeth as well.

Figure 11A:
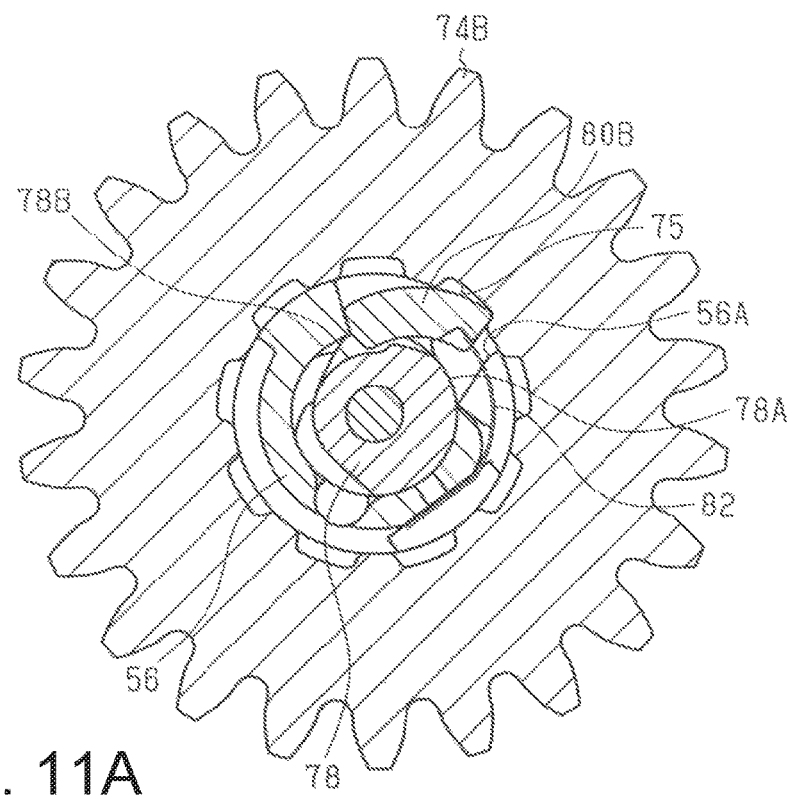
FIG. 11A is a cross-sectional view of the second shaft and the control shaft as seen along section line D11-D11 of FIG. 9 in a state in which the control shaft is housed in the second shaft and the second engagement portion is in the first state.

As shown in FIG. 11A, for example, when the second engagement part 80B and the second control portion 78B are opposed, the distal end of the second engagement part 80B is biased by the spring 82, protrudes from the opening 56A, and engages with the engaged portion 75. For this reason, in a first state in which the second engagement part 80B protrudes from the opening 56A, the second engagement part 80B and the second input side gear 74B mesh.

As shown in FIG. 1B, for example, when the second engagement part 80B and the first control portion 78A are opposed, the proximal end of the second engagement part 80B is pushed in the radial direction of the second shaft 56 by the first control portion 78A. For this reason, the distal end of the second engagement part 80B is retracted in the opening 56A against the biasing force of the spring 82. For this reason, in a second state in which the second engagement part 80B is retracted in the opening 56A, the second engagement part 80B and the second input side gear 74B do not mesh.

Figure 11B:
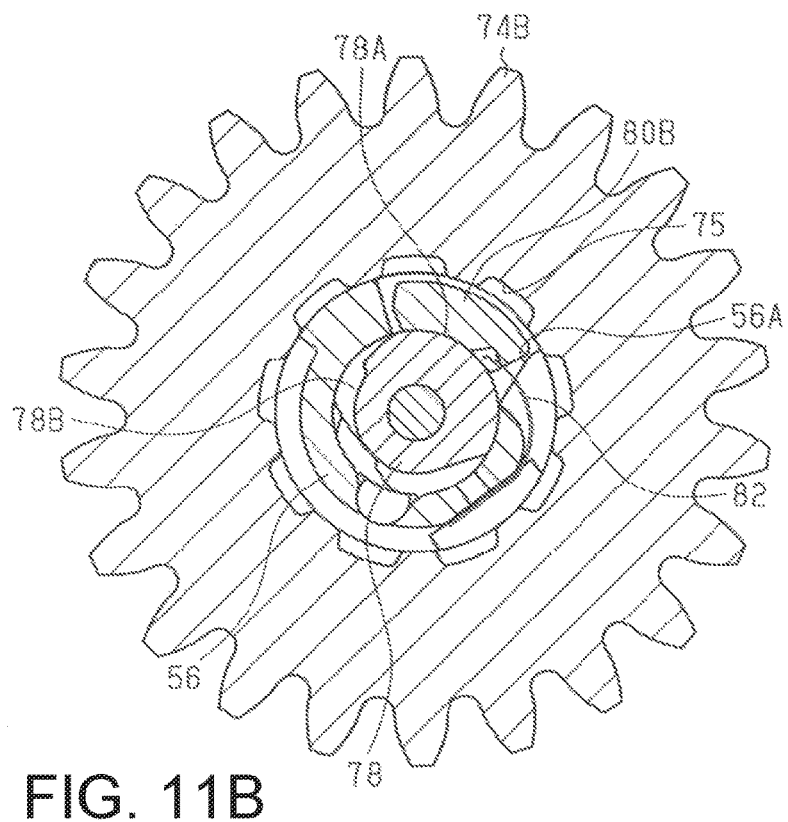
FIG. 11B is a cross-sectional view of the second shaft and the control shaft as seen along section line D11-D11 of FIG. 9 in a state in which the control shaft is housed in the second shaft and the second engagement portion is in the second state.

FIGS. 11A and 11B show a coupled state and an uncoupled state of the second engagement part 80B and the second input side gear 74B; the same applies to the coupling and the uncoupling of the other engagement parts 80 and the corresponding input side gear 74 or output side gear 76 thereof. That is, when the engagement part 80 faces the first control portion 78A, the engagement part 80 is pushed in the radial direction of the second shaft 56 by contacting the first control portion 78A, and moved to the retracted position. On the other hand, when the engagement part 80 faces the second control portion 78B, the proximal end of the engagement part 80 is moved to the recess of the engaged portion 75 and the distal end of the engagement part 80 is moved to the protruding position. The proximal end of the engagement part 80 can be in contact or can be not in contact with the second control portion 78B.

By rotating with respect to the second shaft 56, the control shaft 78 is configured to switch between a first state in which each engagement part 80A-80E protrudes from the opening 56A, and a second state in which each engagement part 80A-80E is retracted in the opening 56A.

When in the first state, the first engagement part 80A configures a one-way clutch along with the first input side gear 74A. When in the first state, the second engagement part 80B configures a one-way clutch along with the second input side gear 74B. When in the first state, the third engagement part 80C configures a one-way clutch along with the first output side gear 76A. When in the first state, the fourth engagement part 80D configures a one-way clutch along with the second output side gear 76B. When in the first state, the fifth engagement part 80E configures a one-way clutch along with the third output side gear 76C. When the rear sprocket 38 is rotated in the direction in which the bicycle 10 moves forward, this type of one-way clutch functions so that power is transmitted from the input side gear 74 to the engagement part 80, and from the engagement part 80 to the output side gear 76.

That is, even if the first engagement part 80A is in the first state, if the rotational speed of the second shaft 56 is higher than the rotational speed of the first input side gear 74A, the first engagement part 80A does not engage with the first input side gear 74A, and the first input side gear 74A is freely rotatable. Even if the second engagement part 80B is in the first state, if the rotational speed of the second shaft 56 is higher than the rotational speed of the second input side gear 74B, the second engagement part 80B does not engage with the second input side gear 74B, and the second input side gear 74B is freely rotatable. Even if the third engagement part 80C is in the first state, if the rotational speed of the second shaft 56 is lower than the rotational speed of the first output side gear 76A, the third engagement part 80C does not engage with the first output side gear 76A, and the first output side gear 76A is freely rotatable. Even if the fourth engagement part 801) is in the first state, if the rotational speed of the second shaft 56 is lower than the rotational speed of the second output side gear 76B, the fourth engagement part 80D does not engage with the second output side gear 76B, and the second output side gear 76B is freely rotatable. Even if the fifth engagement part 80E is in the first state, if the rotational speed of the second shaft 56 is lower than the rotational speed of the third output side gear 76C, the fifth engagement part 80E does not engage with the third output side gear 76C, and the third output side gear 76C is freely rotatable.

The speed increasing mechanism 84 shown in FIG. 5 or FIG. 6 is configured to increase the speed of the rotation of the second shaft 56 and provides the same to the control shaft 78. The speed increasing mechanism 84 comprises a first synchronizing gear 88, a second synchronizing gear 90, a first auxiliary gear 92, a second auxiliary gear 94, a switching drive unit 96, and a first switching unit 98. The speed increasing mechanism 84 is disposed on the opposite side of the support member 66b, with respect to the support member 66a. The speed increasing mechanism 84 is disposed between the support member 66a and the rear sprocket 38 (refer to FIG. 3).

The first synchronizing gear 88 is attached to the end of the second shaft 56 and integrally rotated with the second shaft 56. The second synchronizing gear 90 is attached to the end of the control shaft 78 and is integrally rotated with the control shaft 78. The first synchronizing gear 88 is provided to the end of the second shaft 56 on the side with the rear sprocket 38, and is disposed on the opposite side of the support member 66b with respect to the support member 66a. The second synchronizing gear 90 is provided to the end of the control shaft 78 on the side with the rear sprocket 38, and is disposed on the opposite side of the support member 66b with respect to the support member 66a. The diameter of the second synchronizing gear 90 is smaller than the diameter of the first synchronizing gear 88.

Figure 7:
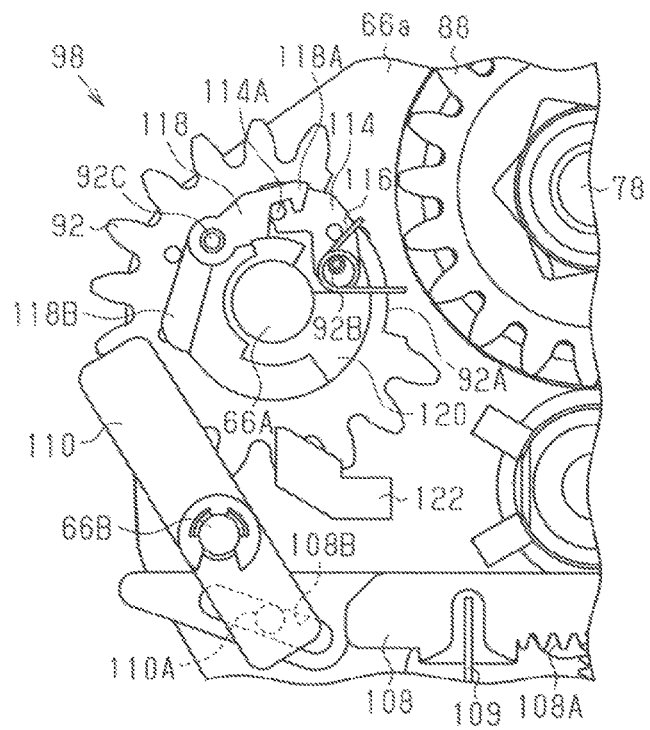
FIG. 7 is an enlarged elevational view of the first switching unit and the periphery of the clutch mechanism illustrated in FIG. 6.

As shown in FIG. 7, the first auxiliary gear 92 is rotatably attached to a support shaft 66A, which is provided to the support member 66a. A toothless portion 92A is formed in the first auxiliary gear 92, in which teeth are not present in a portion of the outer periphery thereof. The first auxiliary gear 92 is disposed in a position in which meshing with the first synchronizing gear 88 is possible. The support shaft 66A is provided parallel to the second shaft 56 and the control shaft 78. When a shifting operation is not being carried out, the toothless portion 92A of the first auxiliary gear 92 is disposed in a position opposing the first synchronizing gear 88, and power is not transmitted between the first synchronizing gear 88 and the first auxiliary gear 92.

As shown in FIGS. 5 and 6, the second auxiliary gear 94 is rotatably attached to a support shaft 66A provided to the support member 66a. The second auxiliary gear 94 is connected to the first auxiliary gear 92. For this reason, the second auxiliary gear 94 is integrally rotated with the first auxiliary gear 92. The second auxiliary gear 94 is disposed in a position in which meshing with the second synchronizing gear 90 is possible. A toothless portion 94A is formed in the second auxiliary gear 94, in which teeth are not present in a portion of the outer periphery thereof. When a shifting operation is not being carried out, the toothless portion 94A of the second auxiliary gear 94 is disposed in a position opposing the second synchronizing gear 90, and power is not transmitted between the second synchronizing gear 90 and the second auxiliary gear 94.

The switching drive unit 96 comprises a shifting motor 100, a motor speed reducing mechanism 101, and a conversion mechanism 103. The conversion mechanism 103 converts a rotary motion into a linear motion. The motor speed reducing mechanism 101 comprises a small-diameter gear 102 and a large-diameter gear 104. The small-diameter gear 102 is attached to the output shaft of the shifting motor 100. The large-diameter gear 104 meshes with the small-diameter gear 102. The conversion mechanism 103 comprises a medium-diameter gear 106 and a guide member 108. The medium-diameter gear 106 is integrally rotated with the large-diameter gear 104. The guide member 108 includes the medium-diameter gear 106 and a rack gear 108A. The switching drive unit 96 further comprises a biasing member 109 and a pair of unlocking members 110 and 112. The biasing member 109 can bias the guide member 108 to a neutral position. The unlocking members 110 and 112 are attached to the ends of the guide member 108 in the longitudinal direction.

As shown in FIG. 4, a portion of the shifting motor 100 is housed in the inner perimeter portion of the first shaft 54. The rotating shaft of the shifting motor 100 is provided parallel to the axis CX of the hub shaft 52. The shifting motor 100 is controlled by the controller 105. The shifting motor 100 is connected to the controller 105 provided to the inner perimeter portion of the first shaft 54. The controller 105 comprises a circuit board 107, an arithmetic circuit, and a memory. The circuit board 107 is connected to electrical wiring (not shown), which passes through the hole 53 formed on the hub shaft 52 and a hole 117 formed on a lock nut 115. The circuit board 107 is connected to the battery 44 and the shift operation device 26 (refer to FIG. 1). The controller 105 can also comprise a wireless communication device and perform wireless communication with the shift operation device 26.

A first through-hole 54A is formed on the first shaft 54, in a position which corresponds to the first input gear 70A or the second input gear 70B. In the present embodiment, the first through-hole 54A is formed in a position corresponding to the second input gear 70B.

Further, a second through-hole 54B is formed on the first shaft 54, in a position which corresponds to one of the first output gear 72A, the second output gear 72B, and the third output gear 72C. In the present embodiment, the second through-hole 54B is formed in a position corresponding to the second output gear 72B.

A first sensor 111 is provided to the inner perimeter part of the first shaft 54 for detecting the rotational speed of the first input gear 70A or the second input gear 70B. A second sensor 113 is provided to the inner perimeter part of the first shaft 54 for detecting the rotational speed of one of the first output gear 72A, the second output gear 72B, or the third output gear 72C. The first sensor 111 and the second sensor 113 are provided to the circuit board 107. The first sensor 111 is provided to a position corresponding to the first through-hole 54A. The second sensor 113 is provided to a position corresponding to the second through-hole 54B. The first sensor 111 and the second sensor 113 are formed of a magnetic sensor, an optical sensor, or the like. When the first sensor 111 and the second sensor 113 are formed of a magnetic sensor, a magnet is provided to the inner perimeter portion of the first input gear 70A or the second input gear 70B, and to the inner perimeter portion of one of the first output gear 72A, the second output gear 72B, and the third output gear 72C.

A cadence of the crankshaft 32 can be calculated by detecting the rotational speed of the first input gear 70A or the second input gear 70B. The cadence of the crankshaft 32 is calculated based on the number of teeth of the front sprocket 36, the number of teeth of the rear sprocket 38, and the rotational speed of the first input gear 70A or the second input gear 70B.

The travel speed of the bicycle 10 can be calculated by detecting the rotational speed of one of the first output gear 72A, the second output gear 72B, and the third output gear 72C. The travel speed of the bicycle 10 is calculated based on the radius or the diameter of the rear wheel, the number of teeth of the first output gear 72A, the number of teeth of the inner gear 64A (refer to FIG. 3) of the hub shell 64, and the rotational speed of one of the first output gear 72A, the second output gear 72B, and the third output gear 72C.

The controller 105 calculates the cadence of the crankshaft 32 or the travel speed of the bicycle 10 based on a program which is set in advance and stored in the memory. Further, the controller 105 calculates the transmission ratio of the transmission 50 from the rotational speed of the first input gear 70A or the second input gear 70B, and the rotational speed of one of the first output gear 72A, the second output gear 72B, and the third output gear 72C, to identify the current gear shift stage. The correspondence between the transmission ratio and the gear shift stage is stored in the memory in advance. When a gear changing signal for increasing the transmission ratio is inputted from the shift operation device 26, the controller 105 drives the shifting motor 100 so that the transmission ratio will become larger, if the current transmission ratio is not the maximum transmission ratio. On the other hand, when a gear changing signal for decreasing the transmission ratio is inputted from the shift operation device 26, the controller 105 drives the shifting motor 100 so that the transmission ratio will become smaller, if the current transmission ratio is not the minimum transmission ratio. A lid which is formed of a material that transmits magnetism or a material that transmits light can be attached to the first through-hole 54A and the second through-hole 54B. The internal space of the first shaft 54 to which is provided the controller 105 is preferably sealed for waterproofing.

The guide member 108 moves along a direction in which the rack gear 108A extends with the rotation of the shifting motor 100 based on a signal from the shift operation device 26 (refer to FIG. 1) being transmitted to the small-diameter gear 102, the large-diameter gear 104, and the medium-diameter gear 106, in that order. When the guide member 108 moves along the direction in which the rack gear 108A extends, the biasing member 109 comes in contact with the guide member 108 and biases the guide member 108 in a direction to return to the initial position.

The first unlocking member 110 shown in FIGS. 5 and 6 is rotatably attached around a support shaft 66B, which is provided to the support member 66A. The support shaft 66B is provided parallel to the support shaft 66A. A support shaft 110A is provided to one end of the first unlocking member 110. The support shaft 110A is parallel to the support shaft 66A. The support shaft 110A is movably inserted into an elongated opening 108B, which is formed at one end of the guide member 108 in the longitudinal direction. When the guide member 108 is moved, the support shaft 110A is guided to the elongated opening 108B, and the first unlocking member 110 is rotated around the support shaft 66B.

The second unlocking member 112 is rotatably attached around a support shaft 66C, which is provided to the support member 66a. The support shaft 66C is provided parallel to the support shaft 66A. A support shaft 112A is provided to one end of the second unlocking member 112. The support shaft 112A is parallel to the support shaft 66C. The support shaft 2A is movably inserted into an elongated opening 108B, which is formed at the other end of the guide member 108 in the longitudinal direction. When the guide member 108 is moved, the support shaft 112A is guided to the elongated opening 108B, and the second unlocking member 112 is rotated around the support shaft 66C.

The first switching unit 98 shown in FIG. 7 switches between a state in which the first auxiliary gear 92 meshes with the first synchronizing gear 88, and a state in which the first auxiliary gear 92 does not mesh with the first synchronizing gear 88. The first switching unit 98 comprises a first key member 114, a spring 116, a locking member 118, a key support member 120, and a guide portion 122. In FIG. 7, a drawing of the second auxiliary gear 94 is omitted.

The first key member 114 is rotatably attached around a support shaft 92B, which is provided to the first auxiliary gear 92. The support shaft 92B is provided parallel to the support shaft 66A. The support shaft 92B supports the proximal end of the first key member 114. A projection 114A is formed at the distal end of the first key member 114. The first key member 114 protrudes from the toothless portion 92A of the first auxiliary gear 92. The first key member 114 is provided so as to be able to move between a protruding position and a retracted position. In the protruding position, the first key member 114 comes in contact with the first synchronizing gear 88. The retracted position is a position in which the first key member 114 does not come in contact with the first synchronizing gear 88.

The spring 116 is attached around the support shaft 92B, and biases the first key member 114 in a direction in which the tip of the first key member 114 protrudes to the protruding position. The spring 116 is formed of a torsion spring.

The locking member 118 is rotatably attached around a support shaft 92C, which is provided to the first auxiliary gear 92, and comprises an engagement portion 118A and a release portion 118B. The support shaft 92C is provided parallel to the support shaft 66A. The support shaft 92C is provided between the engagement portion 118A and the release portion 118B.

The engagement portion 118A has a pawl-shaped tip, and can engage with the projection 114A at the tip of the first key member 114, when the first key member 114 is in the retracted position. The release portion 118B is integrally rotated with the engagement portion 118A around the support shaft 92C. By being pushed by the first unlocking member 110 and being rotated in one direction, the release portion 118B moves the tip of the engagement portion 118A outward of the first auxiliary gear 92, and releases the state in which the tip of the engagement portion 118A and the projection 114A of the first key member 114 are engaged.

The key support member 120 is integrally formed with the first auxiliary gear 92. When the first key member 114 is in the protruding position, the key support member 120 inhibits the rotation of the first key member 114 around the support shaft 92B in a direction in which the first key member 114 moves from the retracted position to the protruding position, and supports the first key member 114. The first auxiliary gear 92 can thereby be rotated in one direction, when the first key member 114 is rotated in one direction around the support shaft 66A.

The guide portion 122 is attached to the support member 66. The guide portion 122 moves the first key member 114 from the protruding position to the retracted position by the first auxiliary gear 92 being rotated. If the first auxiliary gear 92 is rotated when the first key member 114 is in the protruding position, the first key member 114 is rotated in the other direction around the support shaft 92B, by the first key member 114 coming in contact with the guide portion 122. When the first key member 114 is moved to the retracted position, the first key member 114 is held in the retracted position again, by the engagement portion 118A engaging with the projection 114A.

The speed reducing mechanism 86 shown in FIG. 5 or FIG. 6 configured to reduce the speed of the rotation of the second shaft 56 and provides the same to the control shaft 78. The speed reducing mechanism 86 comprises a third synchronizing gear 126, a third auxiliary gear 128, a fourth auxiliary gear 130, and a second switching unit 132. The speed reducing mechanism 86 is disposed on the opposite side of the support member 66b, with respect to the support member 66a. The speed reducing mechanism 86 is disposed between the support member 66a and the rear sprocket 38.

The third synchronizing gear 126 is attached to the end of the control shaft 78 and is integrally rotated with the control shaft 78. The third synchronizing gear 126 is attached further outward than the second synchronizing gear 90 in the axial direction of the control shaft 78. The third synchronizing gear 126 is provided to the end of the control shaft 78 on the rear sprocket 38 side, and disposed on the opposite side of the support member 66b with respect to the support member 66a. The third synchronizing gear 126 has a larger number of teeth than the second synchronizing gear 90. The diameter of the third synchronizing gear 126 is larger than the diameter of the first synchronizing gear 88. The diameter of the third synchronizing gear 126 is larger than the second auxiliary gear 94. The third synchronizing gear 126 can be integrally formed with the second synchronizing gear 90.

Figure 8:
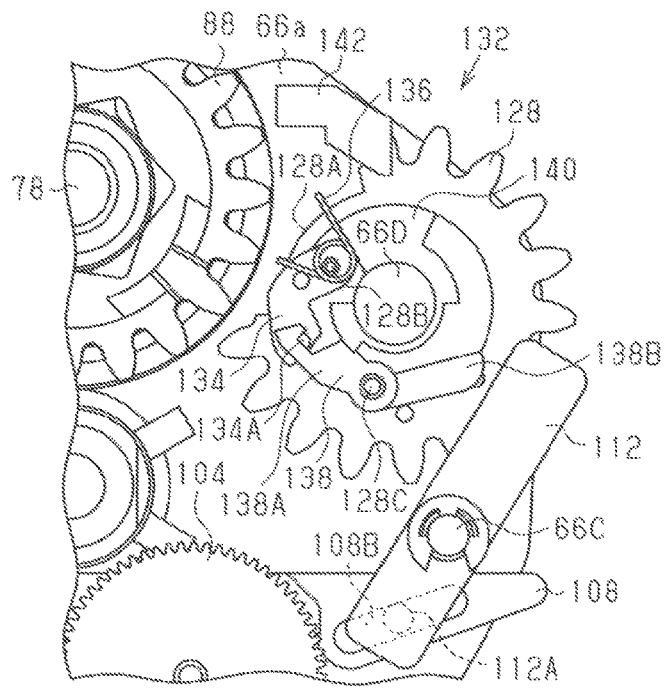
FIG. 8 is an enlarged elevational view of the second switching unit and the periphery of the clutch mechanism illustrated in FIG. 6.

The third auxiliary gear 128 shown in FIG. 8 is rotatably attached to a support shaft 66D, which is provided to the support member 66a. A toothless portion 128A is formed in the third auxiliary gear 128, in which teeth are not present in a portion of the outer periphery thereof. The third auxiliary gear 128 is disposed in a position in which meshing with the third synchronizing gear 126 is possible. In FIG. 8, a drawing of the fourth auxiliary gear 130 is omitted. The support shaft 66D is provided parallel to the second shaft 56 and the control shaft 78. When a shifting operation is not being carried out, the toothless portion 128A of the third auxiliary gear 128 is disposed in a position opposing the first synchronizing gear 88, and power is not transmitted between the first synchronizing gear 88 and the third auxiliary gear 128.

The second switching unit 132 switches between a state in which the third auxiliary gear 128 meshes with the first synchronizing gear 88, and a state in which the third auxiliary gear 128 does not mesh with the first synchronizing gear 88. The second switching unit 132 comprises a second key member 134, a spring 136, a locking member 138, a key support member 140, and a guide portion 142.

The second key member 134 is rotatably attached around a support shaft 128B, which is provided to the third auxiliary gear 128. The support shaft 128B is provided parallel to the support shaft 66D. The support shaft 128B supports the second key member 134. A projection 134A is formed at the distal end of the second key member 134. The second key member 134 protrudes from the toothless portion 128A of the third auxiliary gear 128. The second key member 134 is provided so as to be movable between a protruding position and a retracted position. In the protruding position, the second key member 134 comes in contact with the first synchronizing gear 88. The retracted position, which is a position in which the second key member 134 does not come in contact with the first synchronizing gear 88.

The spring 136 is attached around the support shaft 128B, and biases the second key member 134 in a direction in which the tip of the second key member 134 protrudes to the protruding position. The spring 116 is formed of a torsion spring.

The locking member 138 is rotatably attached around a support shaft 128C, which is provided to the third auxiliary gear 128. The locking member 138 comprises an engagement portion 138A and a release portion 138B. The support shaft 128C is provided parallel to the support shaft 66D. The support shaft 128C is provided between the engagement portion 118A and the release portion 118B.

The engagement portion 138A has a pawl-shaped tip, and can engage with the projection 134A at the tip of the second key member 134, when the second key member 134 is in the retracted position. The release portion 138B is integrally rotated with the engagement portion 138A around the support shaft 128C. By being pushed by the second unlocking member 112 and being rotated in one direction, the release portion 138B moves the tip of the engagement portion 138A outward of the third auxiliary gear 128, and releases a state in which the tip of the engagement portion 138A and the projection 134A of the second key member 134 are engaged.

The key support member 140 is integrally formed with the third auxiliary gear 128. When the second key member 134 is in the protruding position, the key support member 140 inhibits the rotation of the second key member 134 around the support shaft 128B in a direction in which the second key member 134 moves from the retracted position to the protruding position, and supports the second key member 134. The third auxiliary gear 128 can thereby be rotated in one direction, when the second key member 134 is rotated in one direction around the support shaft 66D.

The guide portion 142 is attached to the support member 66. The guide portion 142 moves the second key member 134 from the protruding position to the retracted position by the third auxiliary gear 128 being rotated. If the third auxiliary gear 128 is rotated when the second key member 134 is in the protruding position, the second key member 134 is rotated in the other direction around the support shaft 128B, by the second key member 134 coming in contact with the guide portion 142. When the second key member 134 is moved to the retracted position, the second key member 134 is held in the retracted position again, by the engagement portion 138A engaging with the projection 134A.

As shown in FIGS. 5 and 6, the fourth auxiliary gear 130 is rotatably attached to a support shaft 66D provided to the support member 66a. The fourth auxiliary gear 130 is connected to the third auxiliary gear 128. For this reason, the fourth auxiliary gear 130 is integrally rotated with the third auxiliary gear 128. The fourth auxiliary gear 130 is disposed in a position in which meshing with the third synchronizing gear 126 is possible.

A toothless portion 130A is formed in the fourth auxiliary gear 130, in which teeth are not present in a portion of the outer periphery thereof. The diameter of the fourth synchronizing gear 130 is smaller than the second auxiliary gear 94. When a shifting operation is not being carried out, the toothless portion 130A of the fourth auxiliary gear 130 is disposed in a position opposing the third synchronizing gear 126, and power is not transmitted between the third synchronizing gear 126 and the fourth auxiliary gear 130.

As shown in FIGS. 3 and 4, an inner gear 64A which meshes with the first output gear 72A of the output gears 72 is formed on the hub shell 64. The inner gear 64A is formed in an annular shape around the hub shaft 52, in the inner perimeter portion of the hub shell 64. The inner gear 64A can be integrally formed with the hub shell 64, or, can be formed as a separate body from the hub shell 64 and fixed to the inner perimeter portion of the hub shell 64 by press fitting or the like. The hub shell 64 is rotatably supported to the hub shaft 52. One end of the hub shell 64 in the hub shaft direction is rotatably supported to the drive unit 68 via a bearing. The other end of the hub shell 64 in the hub shaft direction is supported to the second hub shaft 52B via a bearing.

The drive unit 68 comprises a driver 144 and an input part 146. The driver 144 is attached the rear sprocket 38. The power from the driver 144 is transmitted to the input part 146. The drive unit 68 is rotatably supported to the first hub shaft 52A via a lock nut 115. The driver 144 is supported to the lock nut 115 via a bearing. A hole 117 is formed to the lock nut 115 for drawing out the wiring. The driver 144 comprises an attaching portion which can detachably fix the rear sprocket 38. The driver 144 comprises a side wall portion 44A and an annular portion 144B. The side wall portion 144A covers an opening on the side surface of the hub shell 64. The annular portion 144B extends from the side wall portion 144A to the inner perimeter portion of the hub shell 64. The hub shell 64 is rotatably supported to the annular portion 144B via a bearing.

The input portion 146 is connected to the driver 144 via the one-way clutch 146B. The input portion 146 is integrally rotated along with the rear sprocket 38 and the driver 144, when the rear sprocket 38 and the driver 144 rotate in the forward drive direction. The input portion 146 is formed in an annular shape. An inner gear 146A is formed in the input part 146. The inner gear 146A meshes with the first input gear 70A among the input gears 70. The input portion 146 is disposed no that one end thereof in the hub shaft direction surrounds the outer peripheral portion of the annular portion 144B. A one-way clutch 146B is provided between one end in the hub shaft direction and the outer peripheral portion of the annular portion 144B. The one-way clutch 146B transmits the rotation of the driver 144 to the input portion 46, when the rear sprocket 38 is rotated in a direction in which the bicycle 10 moves forward. The one-way clutch 146B can be formed of a roller clutch, or formed of a pawl type clutch.

The action of the transmission 50 will be described.

When the crank arm 30 is rotated by the manual drive force which is applied to the pedal 34 shown in FIG. 1, the front sprocket 36, the chain 40, and the rear sprocket 38 are rotated.

The driver 144 is rotated by the rear sprocket 38 shown in FIG. 3 being rotated. The rotation of the driver 144 is transmitted to the input portion 146 via the one-way clutch 146B. The rotation of the input portion 146 is transmitted to the first input gear 70A, which is meshed with the inner gear 146A of the input portion 146, and to the second input gear 70B, which is integrally formed with the first input gear 70A. In other words, the rotation of the input portion 146 is transmitted to the input gear 70. The rotation of the input gear 70 is transmitted to the input side gear 74 which is meshed with the input gear 70. Of the input side gears 74, the rotation of the first input side gear 74A or the second input side gear 74B which is meshed with the engagement part 80 is transmitted to the second shaft 56 and the control shaft 78. Of the input side gears 74, the first input side gear 74A or the second input side gear 74B which is not meshed with the engagement part 80 is idle around the second shaft 56.

The rotation of the second shaft 56 and the control shaft 78 is transmitted to the first output side gear 76A, the second output side gear 76B, or the third output side gear 76C, which is meshed with the engagement part 80, among the output side gears 76. The two gears of the first output side gear 76A, the second output side gear 76B, and the third output side gear 76C, which are not meshed with the engagement part 80, are idle around the second shaft 56.

The rotation of the output side gear 76 is transmitted to the output gear 72 which is meshed with the output side gear 76. The first output gear 72A, the second output gear 72B, and the third output gear 72C are integrally rotated. The hub shell 64 is rotated around the axis CX of the hub shaft 52 by the inner gear 64A which is meshed with the first output gear 72A being rotated. The rear wheel 18 (refer to FIG. 1) is rotated by the hub shell 64 being rotated.

When there is a request to change the gear shift stage of the transmission 50 by a user operating the shift operation device 26 (refer to FIG. 1), the gear shift stage of the transmission 50 is changed by the relative rotational phase of the second shaft 56 and the control shaft 78 being changed.

Figure 12:
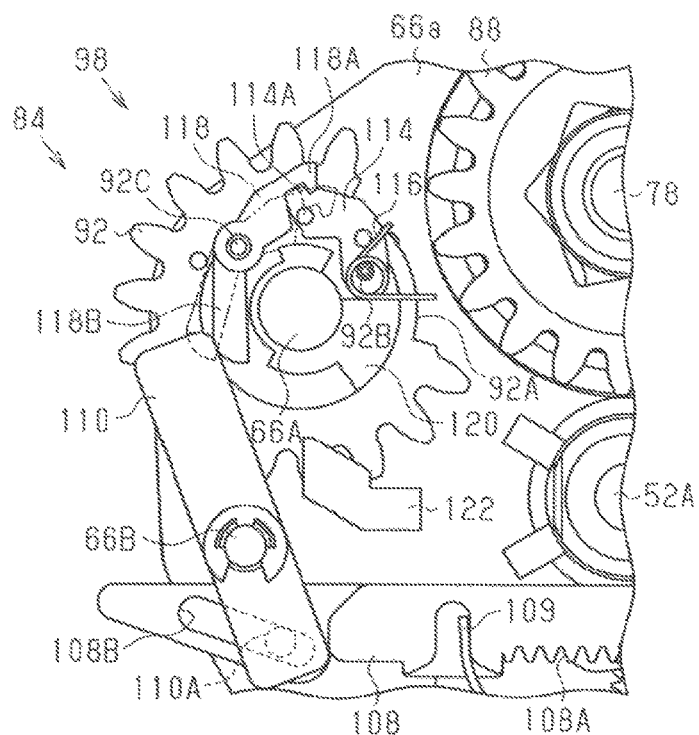
FIG. 12 is an enlarged elevational view of the first switching unit and the peripheral area of the first switching unit, when a first unlocking member is releasing a state in which a locking member and a first key member are engaged.

As shown in FIGS. 5 and 12, for example, when there is a request from the user to increase the transmission ratio of the transmission 50, the shifting motor 100 of the switching drive unit 96 is rotated in one direction, and the rotation of the output shaft of the shifting motor 100 is transmitted to the small-diameter gear 102, the large-diameter gear 104, and the medium-diameter gear 106, in that order. The rotation of the medium-diameter gear 106 is transmitted to the rack gear 108A of the guide member 108, and the guide member 108 is moved in one direction. The first unlocking member 110 is rotated around the support shaft 66B in one direction, and the tip of the first unlocking member 110 comes in contact with the release portion 118B of the locking member 118, by the end of the elongated opening 108B of the guide member 108 coming in contact with the support shaft 110A of the first unlocking member 110. The locking member 118 is thereby rotated around the support shaft 92C, and the engagement of the engagement portion 118A and the projection 114A of the first key member 114 is released.

Figure 13:
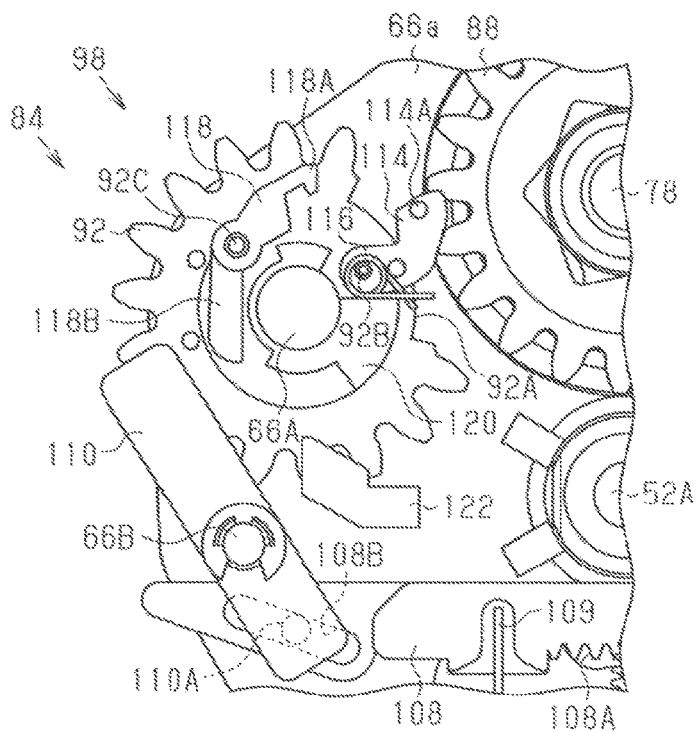
FIG. 13 is an enlarged elevational view of the first switching unit and the peripheral area of the first switching unit, in a state in which the locking member and the first key member are engaged has been released.

As shown in FIG. 13, the first key member 114 is moved from the retracted position to the protruding position by the biasing force of the spring 116, and the first key member 114 is meshed with the first synchronizing gear 88, by the engagement of the engagement portion 118A and the projection 114A of the first key member 114 being released.

Figure 14:
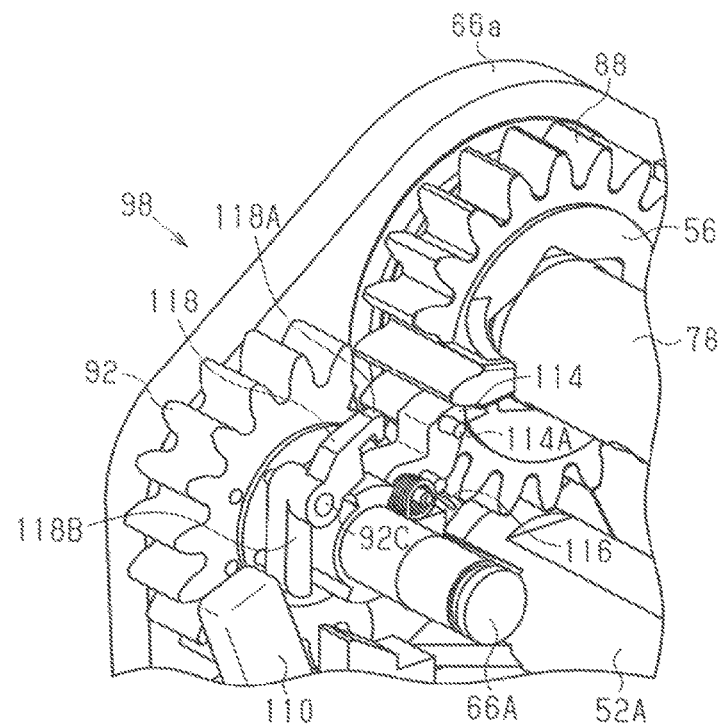
FIG. 14 is a perspective view of the first switching unit and the periphery thereof, in a state in which the first key member and the first synchronizing gear are meshed.
Figure 15:
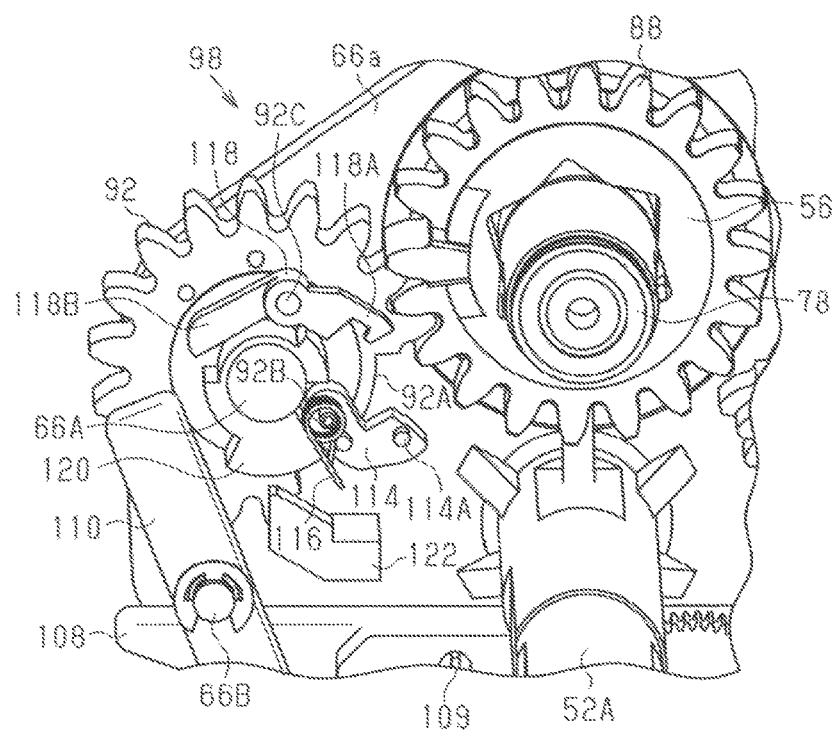
FIG. 15 is an enlarged elevational view of the first switching unit and the peripheral area of the first switching unit, in a state in which the first auxiliary gear and the first synchronizing gear are meshed.

As shown in FIGS. 14 and 15, the first auxiliary gear 92 is rotated and the first auxiliary gear 92 and the first synchronizing gear 88 are meshed, by the rotation of the first synchronizing gear 88 being transmitted to the first key member 114.

Figure 16:
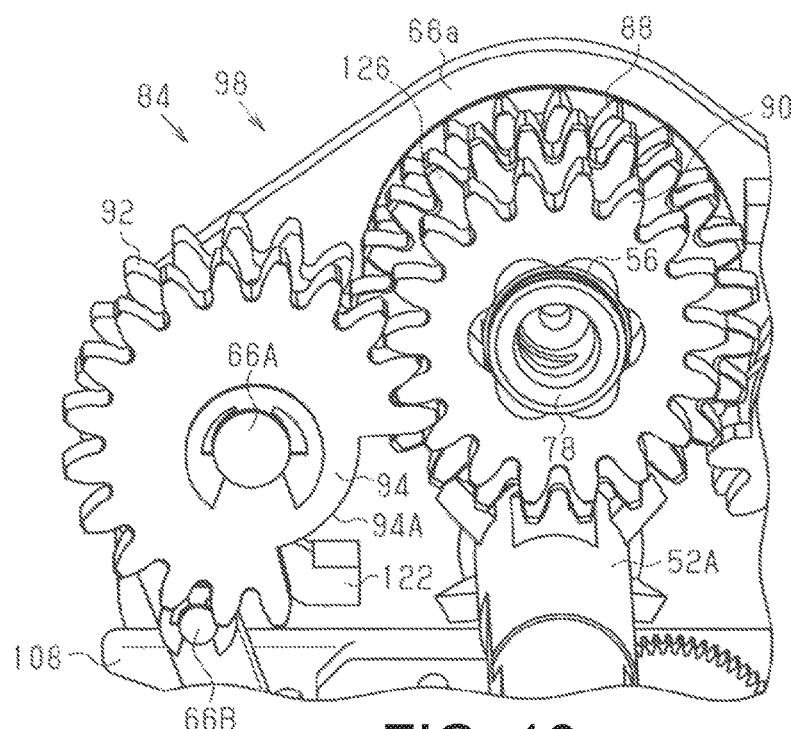
FIG. 16 is an enlarged elevational view of the clutch mechanism, in a state in which the second auxiliary gear and the second synchronizing gear are meshed.

As shown in FIG. 16, along with the first auxiliary gear 92 being rotated, the second auxiliary gear 94 which is connected to the first auxiliary gear 92 is integrally rotated, and the second auxiliary gear 94 is meshed with the second synchronizing gear 90. Since the diameter of the second synchronizing gear 90 is smaller than the diameter of the first synchronizing gear 88, the speed of the rotation of the second shaft 56 is increased and transmitted to the control shaft 78. For this reason, the control shaft 78 is rotated around the axis CZ relative to the second shaft 56, the relative rotational phase of the second shaft 56 and the control shaft 78 is changed, the state of at least one of the engagement parts 80A-80E is changed, and the transmission ratio is increased.

On the other hand, for example, when there is a request from the user to decrease the transmission ratio of the transmission 50, the shifting motor 100 of the switching drive unit 96 is rotated in the other direction, and the rotation of the output shaft of the shifting motor 100 is transmitted to the small-diameter gear 102, the large-diameter gear 104, and the medium-diameter gear 106, in that order. The rotation of the medium-diameter gear 106 is transmitted to the rack gear 108A of the guide member 108, and the guide member 108 is moved in the other direction. The second unlocking member 112 is rotated around the support shaft 66C in one direction, and the tip of the second unlocking member 112 comes in contact with the release portion 138B of the locking member 138, by the end of the elongated opening 108B of the guide member 108 coming in contact with the support shaft 2A of the second unlocking member 112. Then, the second switching unit 132 is operated in the same way as the first switching unit 98, and along with the third auxiliary gear 128 being rotated, the fourth auxiliary gear 130 which is connected to the third auxiliary gear 128 is integrally rotated, and the fourth auxiliary gear 130 is meshed with the third synchronizing gear 126. Since the diameter of the third synchronizing gear 126 is larger than the diameter of the first synchronizing gear 88, the speed of the rotation of the second shaft 56 is decreased and transmitted to the control shaft 78. For this reason, the control shaft 78 is rotated around the axis CZ relative to the second shaft 56, the relative rotational phase of the second shaft 56 and the control shaft 78 is changed, the state of at least one of the engagement parts 80A-80E is changed, and the transmission ratio is decreased.

The operation of the first switching unit 98 after the speed of the rotation of the second shaft 56 is increased and transmitted to the control shaft 78 will be described.

Figure 17:
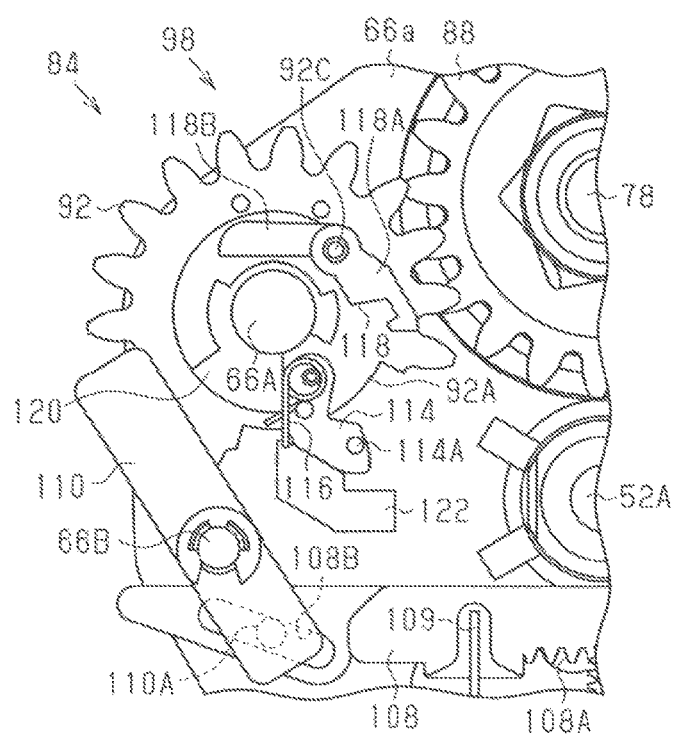
FIG. 17 is an enlarged elevational view of the first switching unit and the peripheral area of the first switching unit, when the first key member is in contact with a guide portion.

As shown in FIG. 17, after the speed of the rotation of the second shaft 56 is increased and transmitted to the control shaft 78, the first key member 114 comes in contact with the guide portion 122, by the first auxiliary gear 92 being rotated by a prescribed angle. When the first auxiliary gear 92 is rotated further in a state in which the first key member 114 and the guide portion 122 are in contact, the first key member 114 moves from the protruding position to the retracted position against the biasing force of the spring 116.

Figures 18, 19:
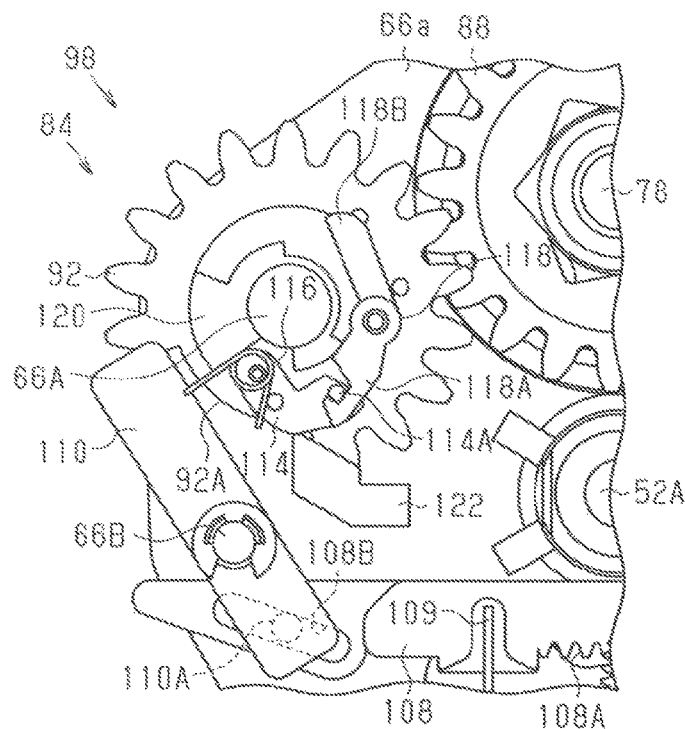
FIG. 18 is an enlarged elevational view of the first switching unit and the peripheral area of the first switching unit, in a state in which the locking member and the first key member are engaged.
FIG. 19 is a table showing the states of the engagement parts corresponding to each gear shift stage.

As shown in FIG. 18, the projection 114A of the first key member 114 and the engagement portion 118A of the locking member 118 are engaged, by the first key member 114 being moved to the retracted position. By the first auxiliary gear 92 being rotated further in a state in which the projection 114A of the first key member 114 and the engagement portion 118A of the locking member 118 are engaged, when the first auxiliary gear 92 is rotated to the position at which the toothless portion 92A of the first auxiliary gear 92 opposes the first synchronizing gear 88, the first auxiliary gear 92 and the first synchronizing gear 88 will no longer mesh, and the state becomes that shown in FIG. 7. The rotation of the first auxiliary gear 92 is thereby stopped. Regarding the second switching unit 132, the state becomes that shown in FIG. 8 by a similar operation, and the rotation of the third auxiliary gear 128 is stopped.

When the first auxiliary gear 92 is rotated one rotation, the control shaft 78 is relatively rotated in a first direction around the axis CZ of the second shaft 56, and the relative rotational phase of the second shaft 56 and the control shaft 78 is changed by a prescribed amount. When the fourth auxiliary gear 130 is rotated one rotation, the control shaft 78 is relatively rotated in a second direction around the axis CZ of the second shaft 56, and the relative rotational phase of the second shaft 56 and the control shaft 78 is changed by a prescribed amount. The position of the second control portion 78B on the second shaft 56 is determined in advance so as to shift one stage, when the relative rotational phase of the second shaft 56 and the control shaft 78 is changed by a prescribed amount.

As shown in FIG. 19, the number of gear shift stages of the transmission 50 of the present embodiment is six. In FIG. 19, "up" indicates that the corresponding engagement part 80 is in a first state, and "down" indicates that the corresponding engagement part 80 is in a second state.

In stage one, the first engagement part 80A which can engage with the first input side gear 74A, and the third engagement part 80C which can engage with the first output side gear 76A, are put in a first state, and the second engagement part 80B, the fourth engagement part 80D, and the fifth engagement part 80E are put in a second state.

In stage two, the first engagement part 80A which can engage with the first input side gear 74A, and the fourth engagement part 80D which can engage with the second output side gear 76B, are put in a first state, and the second engagement part 80B, the third engagement part 80C, and the fifth engagement part 80E are put in a second state.

In stage three, the first engagement part 80A which can engage with the first input side gear 74A, and the fifth engagement part 80E which can engage with the third output side gear 76C, are put in a first state, and the second engagement part 80B, the third engagement part 80C, and the fourth engagement part 80D are put in a second state.

In stage four, the second engagement part 80B which can engage with the second input side gear 74B, and the third engagement part 80C which can engage with the first output side gear 76A, are put in a first state, and the first engagement part 80A, the fourth engagement part 80D, and the fifth engagement part 80E are put in a second state.

In stage five, the second engagement part 80B which can engage with the second input side gear 74B, and the fourth engagement part 80E which can engage with the second output side gear 76B, are put in a first state, and the first engagement part 80A, the third engagement part 80C, and the fifth engagement part 80E are put in a second state.

In stage six, the second engagement part 80B which can engage with the second input side gear 74B, and the fifth engagement part 80E which can engage with the third output side gear 76C, are put in a first state, and the first engagement part 80A, the third engagement part 80C, and the fourth engagement part 80D are put in a second state.

For example, when changing from stage 3 to stage 4, the speed of the rotation of the second shaft 56 is increased by the speed increasing mechanism 84 and transmitted to the control shaft 78, and the fifth engagement part 80E which can engage with the third output side gear 76C is changed from the first state to the second state. Then the second engagement part 80B which can engage with the second input side gear 74B is changed from the first state to the second state.

In stage 4, stage 5, and stage 6, the first engagement part 80A which can engage with the first input side gear 74A, can be in the first state or the second state. In stage 4, stage 5, and stage 6, the rotational speed of the second input side gear 74B is higher than the rotational speed of the first input side gear 74A. For this reason, since the rotational speed of the second shaft 56 becomes higher than the rotational speed of the first input side gear 74A, even if the first engagement part 80A is in the first state, the first engagement part 80A will not engage with the first input side gear 74A. Therefore, the first engagement part 80A is not required to be controlled by the control shaft 78.

Further, in state 2, stage 3, stage 5, and stage 6, the third engagement part 80C which can engage with the first output side gear 76A, can be in the first state or the second state. In stage 2, stage 3, stage 5, and stage 6, the rotational speed of the second output side gear 76B or the third output side gear 76C is higher than the rotational speed of the first output side gear 76A. For this reason, since the rotational speed of the second shaft 56 becomes lower than the rotational speed of the first output side gear 76A, even if the third engagement part 80C is in the first state, the third engagement part 80C will not engage with the first output side gear 76A. Therefore, the third engagement part 80C is not required to be controlled by the control shaft 78.

If the engagement parts 80 are required to be operated when shifting, the engagement parts 80 which should be operated can be configured to move at roughly the same time, or configured so that the engagement parts 80 which should be switched from the first state to the second state are operated, after which the engagement portions which should be switched from the second state to the first state are operated. By setting the position of the second control portion 78B around the control shaft 78 beforehand, the operation timing of the engagement part 80 can be set.

According to the transmission 50, for example, the following effects can be obtained.

(1) The speed increasing mechanism 84 and the first switching unit 98 of the clutch mechanism 62 increase the speed of the rotation of the second shaft 56 by the manual drive force and transmits the same to the control shaft 78, and increases the gear shift stage of the transmission 50. Accordingly, the gear shift stage of the transmission 50 can be appropriately changed, and the shifting performance is improved.

(2) The speed increasing mechanism 84 and the first switching unit 98 of the clutch mechanism 62 increase the speed of the rotation of the second shaft 56 by the manual drive force and transmits the same to the control shaft 78, and changes the gear shift stage of the transmission 50. In this manner, since the transmission 50 performs shifting by using a manual drive force with a large force, shifting becomes easier.

(3) The speed increasing mechanism 84 and the second switching unit 132 of the clutch mechanism 62 decrease the speed of the rotation of the second shaft 56 by the manual drive force and transmits the same to the control shaft 78, and changes the gear shift stage of the transmission 50. In this manner, since the transmission 50 performs shifting by using a manual drive force with a large force, shifting becomes easier.

(4) The transmission 50 comprises the first shaft 54 and the second shaft 56 which are provided separated from the axis CX of the hub shaft 52. The first rotating body 58 is attached to the first shaft 54, and a second rotating body 60 is attached to the second shaft 56. For this reason, the transmission 50 has a high degree of freedom in design.

Second Embodiment

A transmission 150 in accordance with a second embodiment will be described with reference to FIGS. 20 to 25. The configurations that are common to the first embodiment are given the same reference symbols as the first embodiment, and the descriptions thereof will be omitted.

Figure 20:
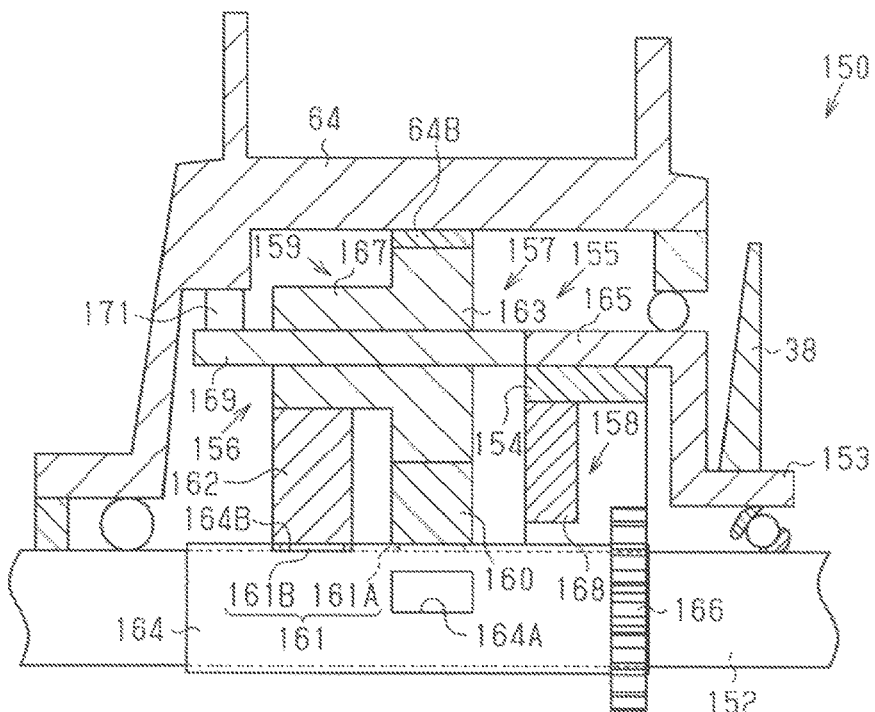
FIG. 20 is a partial cross-sectional view of a transmission in accordance with a second embodiment.
Figure 21:
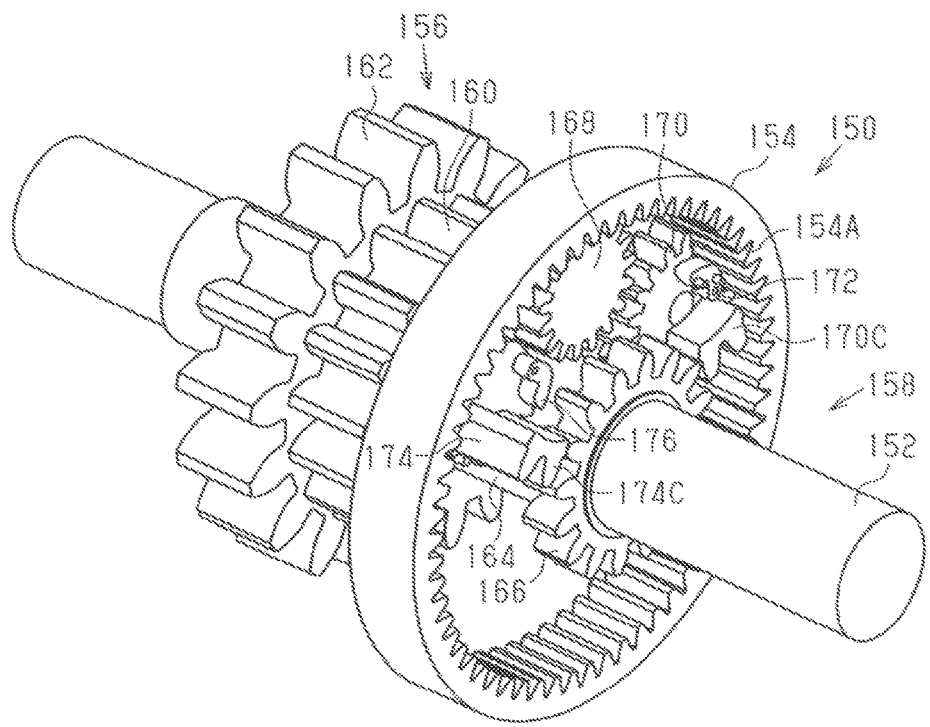
FIG. 21 is a perspective view of the transmission illustrated in FIG. 20 in accordance with the second embodiment.
Figure 22:
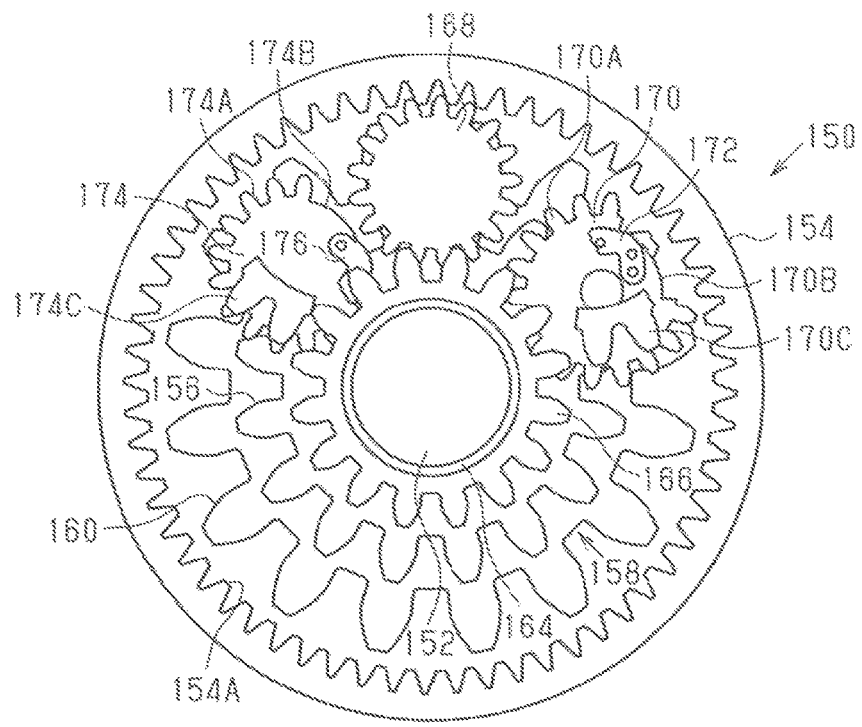
FIG. 22 is a front elevational view of the transmission mechanism of the transmission illustrated in FIG. 20.

As shown in FIGS. 20, 21 and 22, the transmission 150 as an internal transmission comprises a hub shaft 152, a driver 153, a transmission unit 156, and a clutch unit 158. The transmission 150 of the second embodiment is a transmission provided with a planetary gear mechanism 155, such as that disclosed in, for example, Japanese Patent No. 3654845. The transmission 150 non-rotatably fixes the hub shaft 152 to a frame 12 (refer to FIG. 1) of the bicycle 10, and comprises a structure to control a pawl 161 provided on the hub shaft 152, in order to control a first sun gear 160 and a second sun gear 162 of the planetary gear mechanism 155.

The rear sprocket 38 (refer to FIG. 3) is attached to the driver 153, which is rotated in one direction by the manual drive force being transmitted thereto. A one-way clutch which can transmit a rotation to the driver 153 only when the rear sprocket 38 is rolled forward can be provided between the rear sprocket 38 and the driver 153.

The transmission unit 156 is connected to the driver 153 and can include a plurality of gear shift stages. The transmission 150 comprises a plurality of planetary gear mechanisms 155 in a power transmission path between the driver 153 and the huh shell 64. Each of the planetary gear mechanisms 155 comprises a first planetary gear mechanism 157 and a second planetary gear mechanism 159. The transmission unit 156 performs shifting by switching a plurality of power transmission paths between the driver 153 and the hub shell 64.

The transmission unit 156 further comprises a pawl 161 for controlling the first planetary gear mechanism 157 and the second planetary gear mechanism 159. The pawl 161 is attached to the outer periphery surface of the huh shaft 152, and comprises a pawl 161A and a pawl 161B which are biased radially outward.

The pawl 161A controls the first sun gear 160 of the first planetary gear mechanism 157. The pawl 161B controls the second sun gear 162 of the second planetary gear mechanism 159.

The first planetary gear mechanism 157 comprises a ring gear 64B, a plurality of first planetary gears 163, a first carrier 165, and a first sun gear 160. The ring gear 64B is formed in an inner perimeter portion of the hub shell 64. The first carrier 165 rotatably supports the first planetary gears 163. The first planetary gears 163 mesh with the ring gear 64B and the first sun gear 160. The first sun gear 160 is rotatable around the axis of the hub shaft 152.

The second planetary gear mechanism 159 comprises a ring gear 64B, a plurality of second planetary gears 167, a second carrier 169 and a second sun gear 162. The ring gear 64B is formed in an inner perimeter portion of the hub shell 64. The second carrier 169 rotatably supports the second planetary gears 167. The second planetary gears 167 is integrally formed with the first planetary gears 163, and mesh with the second sun gear 162.

The second sun gear 162 is rotatable around the axis of the hub shaft 152. The diameter of the second sun gear 162 is larger than the first sun gear 160.

The first planetary gear 163 and the second planetary gear 167 form a stepped planetary gear. The diameter of the first planetary gear 163 is larger than the diameter of the second planetary gear 167.

The first carrier 165 and the second carrier 169 are integrally formed. The first carrier 165 is coupled to the driver 153. The second carrier 169 is connected to the hub shell 64 via the one-way clutch 171.

The clutch unit 158 switches between a first state in which a rotational force of the driver 153 in one direction is transmitted to the transmission unit 156 as a rotational force in a first rotational direction to operate the transmission unit 156, and a second state in which the rotational force of the driver 153 in the one direction is transmitted to the transmission unit 156 as a rotational force in the opposite rotational direction of the first rotational direction to operate the transmission unit. Further, the clutch unit 158 is capable of switching between a first state, a second state, and a third state in which the rotation of the driver 153 in one direction is not transmitted to the transmission unit 156. The clutch unit 158 controls the rotation state of the first sun gear 160 and the second sun gear 162.

The clutch unit 158 comprises an input portion 154, a hollow shaft 164, a first gear 166, a second gear 168, a third gear 170, a first key member 172, a fourth gear 174, and a second key member 176. The input portion 154 is provided to the driver 153, and integrally rotates with the driver 153. The input portion 154 can be integrally formed with the driver 153 as well. The input portion 154 is formed in an annular shape.

The hollow shaft 164 is rotatably attached with respect to the hub shaft 152. Two openings 164A and 164B are formed on the outer peripheral portion of the hollow shaft 164. Pawls 161A and 161B are attached to the outer periphery of the hub shaft 152. The pawls 161A and 161B are respectively disposed to the openings 164A and 164B. When the opening 164A and the pawl 161A are facing, the pawl 161A protrudes from the opening 164A and meshes with the first sun gear 160. At this time, since the opening 164B and the pawl 161B are not facing, the pawl 161B does not protrude from the opening 164B.

When the opening 164B and the pawl 161B are facing, the pawl 161B protrudes from the opening 164B and meshes with the second sun gear 162. At this time, since the opening 164A and the pawl 161A are not facing, the pawl 161A does not protrude from the opening 164A. A gear that meshes with the pawl 161A or the pawl 161B of the first sun gear 160 or the second sun gear 162 is called "transmission gear" below.

When both of the two openings 164A and 164B are not facing the two pawls 161A and 161B, the two pawls 161A and 161B do not protrude from the openings 164A ad 164B.

As described above, the hollow shaft 164 can control the pawls 161A, 161B to put the first sun gear 160 and the second sun gear 162 into one of the following three states. The transmission 150 thereby functions as a three-stage transmission.

When the gear shift stage number is one, the first sun gear 160 and the second sun gear 162 do not mesh with the pawl 161A and the pawl 161B. That is, when the gear shift stage number is one, a transmission gear is not present.

When the gear shift stage number is two, the first sun gear 160 does not mesh with the pawl 161A, and the second sun gear 162 meshes with the pawl 161B. That is, when the gear shift stage number is two, the second sun gear 162 becomes the transmission gear.

When the gear shift stage number is three, the first sun gear 160 meshes with the pawl 161A, and the second sun gear 162 does not mesh with the pawl 161B. That is, when the gear shift stage number is three, the first sun gear 160 becomes the transmission gear.

The first gear 166 is fixed to an end of the hollow shaft 164, and can be integrally rotated with the hollow shaft 164. The first gear 166 and the hollow shaft 164 are provided coaxially with the hub shaft 152. The first gear 166 is fixed to the end of the hollow shaft 164 on the driver 153 side.

The second gear 168 meshes with an inner gear 154 formed to the input portion 154 along the circumferential direction of the input portion 154. The second gear 168 is rotatably supported to a support body (not shown) provided fixed to the hub shaft 152. The rotational shaft of the second gear 168 is provided parallel to the hub shaft. The second gear 168 is disposed in a position that does not mesh with the third gear 170, and in which meshing with the fourth gear 174 is possible. The second gear 168 is not meshed with the first gear 166.

The third gear 170 is disposed in a position in which meshing with the inner gear 154A of the input portion 154 is possible, on the inner perimeter side of the driver 153. The third gear 170 comprises a plurality of normal teeth 170A, a toothless portion 170B and a plurality of coupling teeth 170C. The normal teeth 170A mesh with the inner gear 154A. The toothless portion 170B is a portion in which the normal teeth 170A are not present in a portion of the outer periphery of the third gear 170. The coupling teeth 170C are capable of meshing with the first gear 166. The coupling teeth 170C are formed in a position farther away from the transmission unit 156 than the normal teeth 170A in the axial direction of the hub shaft 152.

The first key member 172 is attached to the third gear 170. The first key member 172 is provided protruding from the toothless portion 170B of the third gear 170 so as to be able to move between a protruding position and a retracted position. In the protruding position, the first key member 172 comes in contact with the inner gear 154A of the input portion 154. In the retracted position, the first key member 172 does not come in contact with the inner gear 154A. The movement of the first key member 172 between the protruding position and the retracted position is carried out by an electric motor (not shown).

The fourth gear 174 is disposed in a position in which meshing with the second gear 168 is possible, on the inner perimeter side of the input portion 154. The fourth gear 174 comprises a plurality of normal teeth 174A, a toothless portion 174B, and a plurality of coupling teeth 174C. The normal teeth 174A mesh with the second gear 168. The toothless portion 174B is a portion in which the normal teeth 174A are not present in a portion of the outer periphery of the fourth gear 174. The coupling teeth 174C are capable of meshing with the first gear 166. The coupling teeth 174C are formed in a position farther away from the transmission unit 156 than the normal teeth 174A in the axial direction of the hub shaft 152.

The second key member 176 is attached to the fourth gear 174. The second key member 176 is provided protruding from the toothless portion 174B of the fourth gear 174 so as to be movable between a protruding position and a retracted position. In the protruding position, the second key member 176 comes in contact with the second gear 168. In the retracted position, the second key member 176 does not come in contact with the second gear 168. The movement of the second key member 176 between the protruding position and the retracted position is carried out by an electric motor (not shown). The control of the first key member 172 and the second key member 176 can be carried out by changing the rotational direction of one electric motor, as in the above-described embodiment.

The action of the transmission 150 will be described.

The rotation of the driver 153 is transmitted to the planetary gear mechanism 155 via the first carrier 165. The planetary gear that is meshed with the transmission gear from among the first planetary gear 163 and the second planetary gear 167 revolves around the transmission gear while rotating, and transmits the rotation to the ring gear 64B of the hub shell 64. If a transmission gear is not present, the planetary gear transmits the rotation from the second carrier 169 to the hub shell 64. The clutch unit 158 maintains the third state in which the rotation of the driver 153 in one direction is not transmitted to the hollow shaft 164.

When there is a request to change the gear shift stage of the transmission 150 by a user operating the shift operation device 26 (refer to FIG. 1), the gear shift stage (transmission ratio) of the transmission 150 is changed by the relative rotational phase of the hub shaft 152 and the hollow shaft 164 being changed.

Figure 23:
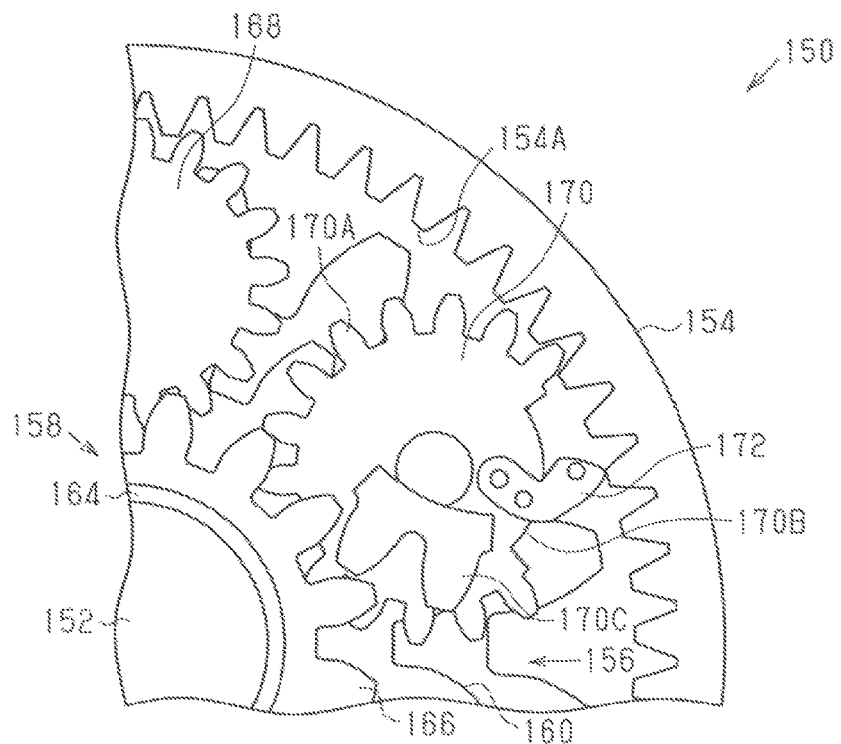
FIG. 23 is a front elevational view of the transmission mechanism of the transmission of FIG. 22 when the first key member is in the protruding position.

As shown in FIG. 23, when there is a request to increase the transmission ratio of the transmission 150 from the user, the first key member 172 is moved from the retracted position to the protruding position by a motor that drives the first key member 172. The first key member 172 and the inner gear 154A come in contact, and the rotation of the driver 153 is transmitted to the third gear 170, by the first key member 172 moving to the protruding position.

Figure 24:
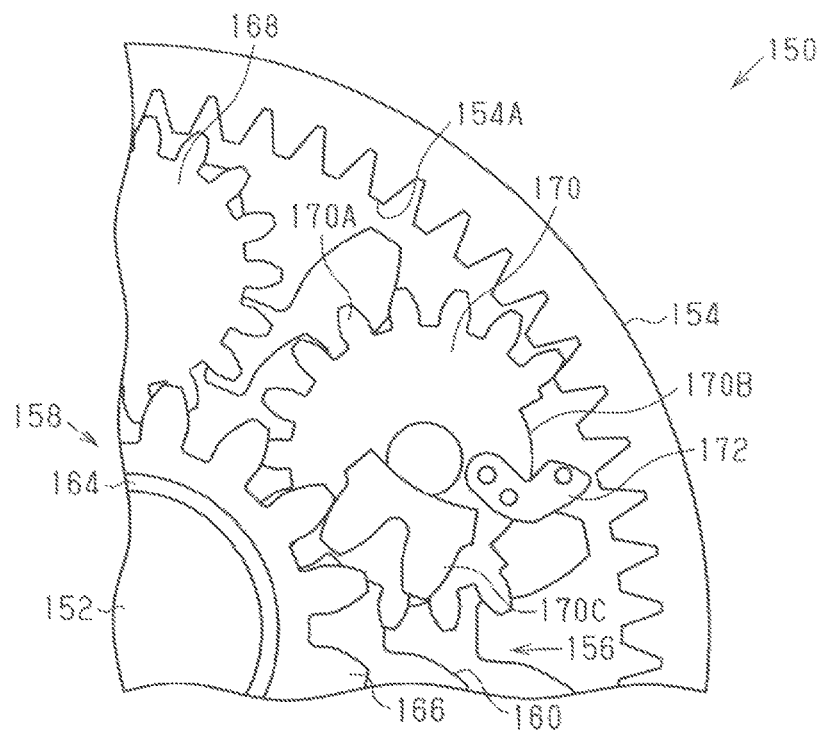
FIG. 24 is a front elevational view of the transmission mechanism of the transmission illustrated in FIG. 22 in a state in which a coupling teeth and the first gear are meshed.

As shown in FIG. 24, the coupling teeth 170C and the first gear 166 are meshed and the rotation of the driver 153 is transmitted to the first gear 166 by the third gear 170 being rotated, entering a second state in which the first gear 166 is rotated in an opposite rotational direction of the first rotational direction, which is the rotational direction of the driver 153. That is, the first gear 166 is relatively rotated with respect to the hub shaft 152, and the state of the pawls 161A and 161B is switched. Accordingly, the transmission gear can be switched from the first sun gear 160 to the second sun gear 162. If there is a request to increase the transmission ratio in a state in which the transmission ratio of the transmission 150 is the highest, the controller does not operate the motor.

Figure 25:
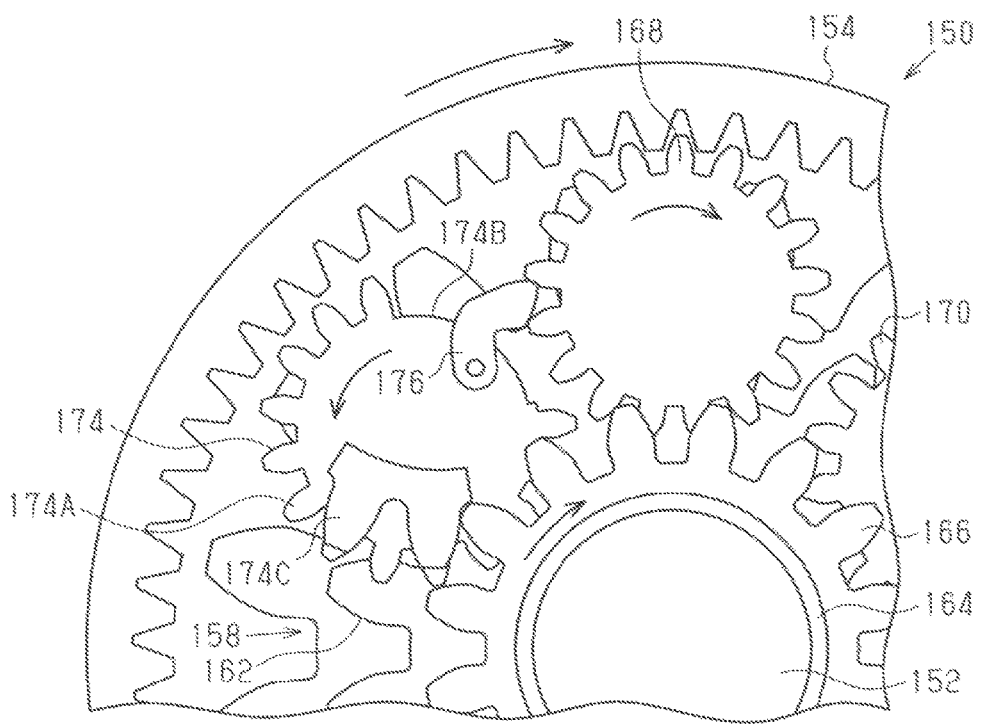
FIG. 25 is a front elevational view of the transmission mechanism of the transmission illustrated in FIG. 22 when the second key member is in the protruding position.

On the other hand, as shown in FIG. 25, when there is a request to decrease the transmission ratio of the transmission 150 from the user, the second key member 176 is moved from the retracted position to the protruding position by a motor that drives the second key member 176. The second key member 176 and the second gear 168 come in contact by the second key member 176 moving to the protruding position. The normal teeth 174A of the fourth gear 174 is meshed with the first gear 166 by the rotation of the second gear 168 in the first rotational direction being transmitted to the fourth gear 174. Accordingly, the state becomes a first state in which the first gear 166 is rotated in the first rotational direction of the driver 153. That is, the first gear 166 is relatively rotated with respect to the hub shaft 152, and the state of the pawls 161A and 161B is switched. Accordingly, the transmission gear can be switched from the second sun gear 162 to the first sun gear 160. If there is a request to increase the transmission ratio in a state in which the transmission ratio of the transmission 150 is the lowest, the controller does not operate the motor.

According to the transmission 150, for example, the following effects can be obtained.

(5) Since the gear shift stage of the transmission 150 is changed by utilizing the manual drive force that is transmitted to the driver 153, the shifting performance can be maintained high even in a state in which the drive force that is inputted to the transmission 150 is a high load.

Modified Example

The description relating to the above-described embodiment is an example of forms that the transmission according to the present invention can take, and is not intended to limit the forms thereof. The transmission according to the present invention can, in addition to the embodiment, take the forms of the modified examples of the embodiment shown below, as well as forms that combine at least two modified examples that are not mutually contradictory.

In a modified example of the transmission 50, at least one of the input gear 70 and the output gear 72 is integrally rotated with the first shaft 54.

A modified example of the internal transmission 50 comprises a sprocket or a pulley instead of the gear of the first rotating body 58 and the second rotating body 60. In the transmission 50 of this modified example, the first rotating body 58 and the second rotating body 60 are coupled by a chain or a belt, and a reverse rotation mechanism for reversing the direction of rotation is provided between the drive unit 68 and the first rotating body 58, or, between the second rotating body 60 and the hub shell 64. A reverse rotation mechanism can include, for example, a plurality of gears.

In a modified example of the transmission 50, the second input gear 70B is omitted. In the internal transmission 50 of this modified example, the second input side gear 74B, the second engagement part 80B corresponding to the second input side gear 74B, the second control portion 78B, and the opening 56A are also omitted. That is, the number of gear shift stages of the transmission 50 of this modified example is three.

In a modified example of the internal transmission 50, at least one of the second output gear 72B and the third output gear 72C is omitted. When omitting the second output gear 72B, the second output side gear 76B, as well as the corresponding fourth engagement part 80D, the second control portion 78B, and the opening 56A are also omitted. When omitting the third output gear 72C, the third output side gear 76C, as well as the corresponding fifth engagement part 80E, the second control portion 78B, and the opening 56A are also omitted. When one gear is omitted, the number of gear shift stages of the transmission 50 of this modified example is three. When two gears are omitted, the number of gear shift stages of the transmission 50 of this modified example is four.

In a modified example of the internal transmission 50, the first input side gear 74A or the second input side gear 74B is omitted. When omitting the first input side gear 74A, the engagement part 80A corresponding to the first input side gear 74A, the second control portion 78B, and the opening 56A are also omitted. When omitting the second input side gear 74B, the second input gear 70B, the second engagement part 80B corresponding to the second input side gear 74B, the second control portion 78B, and the opening 56A are also omitted. That is, the number of gear shift stages of the transmission 50 of this modified example is three.

In a modified example of the transmission 50, one gear or two gears among the first output side gear 76A, the second output side gear 76B, and the third output side gear 76C are omitted. When omitting the first output side gear 76A, the engagement part 80A corresponding to the first output side gear 74A, the second control portion 78B, and the opening 56A are also omitted. When omitting the second output side gear 76B, the fourth engagement part 80D corresponding to the first output side gear 76A, the second control portion 78B, and the opening 56A are also omitted, and the second output gear 72B can also be omitted. When omitting the third output side gear 76C, the fifth engagement part 80E corresponding to the third output side gear 76C, the second control portion 78B, and the opening 56A are also omitted, and the third output gear 72C can also be omitted. When one gear is omitted, the number of gear shift stages of the transmission 50 of this modified example is four. When two gears are omitted, the number of gear shift stages of the transmission 50 of this modified example is two.

In a modified example of the transmission 50, the speed increasing mechanism 84, the switching drive unit 96, the first switching unit 98, the speed reducing mechanism 86, and the second switching unit 132 are omitted. In the transmission 50 of this modified example, the relative rotational phase of the control shaft 78 with respect to the second shaft 56 is changed by an actuator such as an electric motor rotating the control shaft 78 directly or via a motor speed reducing mechanism, to change the gear shift stage of the transmission 50.

In a modified example of the transmission 50, the distance between the hub shaft 52 and the first shaft 54 in the radial direction of the hub shell 64, and the distance between the hub shaft 52 and the second shaft 56 in the radial direction of the hub shell 64, are different.

In a modified example of the transmission 50, the axis CY of the first shaft 54 and the axis CZ of the second shaft 56 are not disposed symmetrically with respect to the axis CX of the hub shaft 52.

The transmission 50 of a modified example can be shifted so that the transmission ratio becomes lower by the speed increasing mechanism 84, and shifted so that the transmission ratio becomes higher by the speed reducing mechanism 86.

In a modified example of the transmission 50, the input gear 70 and the input side gear 74 can each be formed of three or more gears, and the output gear 72 and the output side gear 76 can each be formed of four or more gears.

The rear sprocket 38 is provided coaxially with the hub shaft 52, but the rear sprocket 38 can also be provided to rotate around a different axis than the hub shaft 52. In the transmission 50, for example, a rear sprocket 38 can be provided coaxially with the first shaft 54.

In a modified example of the transmission 50, the axis CY of the first shaft 54 and the axis CZ of the second shaft 56 are not disposed symmetrically with respect to the axis CX of the hub shaft 52.

A modified example of the transmission 50 comprises three or more planetary gear mechanisms and three or more pawls. Additionally, the configuration of the transmission unit 156 can be any configuration, as long as the configuration controls a sun gear.

The transmissions 50 and 150 of the modified examples are provided in the vicinity of the crankshaft 32. For example, the crankshaft 32 is directly or indirectly connected to the driver 144, and the inner gear 64A of the hub shell 64 is directly or indirectly connected to the front sprocket 36. In this case, the hub shell 64 can be omitted.

The transmissions 50 and 150 of the modified example are provided inside the assist mechanism 22. For example, the crankshaft 32 is directly or indirectly connected to the driver 144, and the inner gear 64A of the hub shell 64 is directly or indirectly connected to the front sprocket 36. In this case, the hub shell 64 can be omitted.

The rear sprocket 38 is provided coaxially with the hub shaft 52, but the rear sprocket 38 can also be provided to rotate around a different axis than the hub shaft 52. In the transmission 50, for example, the rear sprocket 38 can be provided coaxially with the first shaft 54.

In a modified example of the transmission 50, the engagement part 80 is provided to the control shaft 78, and the engagement part 80 is switched between the first state and the second state by the second shaft 56. In this modified example, each of the positions of the openings 56A in the circumferential direction of the second shaft 56 is different, and, of the first engagement part 80A to the fifth engagement part 80E, the engagement part 80 which faces the opening 56A is in the first state, and the engagement parts 80 which do not face the opening 56A are in the second state.

While only selected embodiments have been chosen to illustrate the present invention, it will be apparent to those skilled in the art from this disclosure that various changes and modifications can be made herein without departing from the scope of the invention as defined in the appended claims. For example, unless specifically stated otherwise, the size, shape, location or orientation of the various components can be changed as needed and/or desired so long as the changes do not substantially affect their intended function. Unless specifically stated otherwise, components that are shown directly connected or contacting each other can have intermediate structures disposed between them so long as the changes do not substantially affect their intended function. The functions of one element can be performed by two, and vice versa unless specifically stated otherwise. The structures and functions of one embodiment can be adopted in another embodiment. It is not necessary for all advantages to be present in a particular embodiment at the same time. Every feature which is unique from the prior art, alone or in combination with other features, also should be considered a separate description of further inventions by the applicant, including the structural and/or functional concepts embodied by such feature(s). Thus, the foregoing descriptions of the embodiments according to the present invention are provided for illustration only, and not for the purpose of limiting the invention as defined by the appended claims and their equivalents.

What is claimed is:

1. A transmission of a bicycle comprising:
an input rotating body to which a drive force is inputted, the input rotating body comprising an input gear;
a plurality of rotating bodies to which are transmitted rotation of the input rotating body, plurality of rotating bodies comprising an input side gear which meshes with the input rotating body;
a hollow shaft coaxially provided with the rotating bodies and rotatably supporting the rotating bodies; and
a clutch mechanism including a control shaft disposed inside the hollow shaft and being rotatably arranged relative to the hollow shaft, and configured to switch a coupling state between the rotating bodies and the hollow shaft by rotating the control shaft relative to the hollow shaft,
the clutch mechanism being configured to rotate the control shaft by transmitting a drive force that is applied to the input rotating body to the control shaft.

2. The transmission as recited in claim , further comprising
   a first shaft separated from the hollow shaft, and
   an output rotating body, to which is transmitted rotation from the rotating bodies, and which outputs the rotation,
   the input rotating body and the output rotating body being rotatably disposed about an axis of the first shaft.

3. A transmission of a bicycle comprising:
   an input rotating body to which a drive force is inputted;
   a plurality of rotating bodies to which are transmitted rotation of the input rotating body;
   a hollow shaft coaxially provided with the rotating bodies and rotatably supporting the rotating bodies; and
   a clutch mechanism including a control shaft disposed inside the hollow shaft and being rotatably arranged relative to the hollow shaft, and configured to switch a coupling state between the rotating bodies and the hollow shaft by rotating the control shaft relative to the hollow shaft,
   the clutch mechanism being configured to rotate the control shaft by transmitting a drive force that is applied to the input rotating body to the control shaft
   the clutch mechanism comprising:
      a speed increasing mechanism configured to increases a speed of rotation of the hollow shaft and providing the same to the control shaft, and
      a speed reducing mechanism configured to reduce the speed of the rotation of the hollow shaft and providing the same to the control shaft.

4. The transmission as recited in claim 3, wherein
   the speed increasing mechanism comprises:
   a first synchronizing gear which is integrally rotated with the hollow shaft,
   a second synchronizing gear which is integrally rotatable with the control shaft,
   a first auxiliary gear which can mesh with one of the first synchronizing gear and the second synchronizing gear,
   a second auxiliary gear which meshes with the other of the first synchronizing gear and the second synchronizing gear and is integrally rotated with the first auxiliary gear, and
   a first switching unit which switches between a state in which the first auxiliary gear meshes with one of the first synchronizing gear and the second synchronizing gear, and a state in which the first auxiliary gear does not mesh with one of the first synchronizing gear and the second synchronizing gear.

5. The transmission as recited in claim 4, wherein
   the speed decreasing mechanism comprises:
   the first synchronizing gear,
   a third synchronizing gear which can he integrally rotated with the control shaft and which has fewer number of teeth than the second synchronizing gear,
   a third auxiliary gear which can mesh with one of the first synchronizing gear and the third synchronizing gear,
   a fourth auxiliary gear which meshes with the other of the first synchronizing gear and the third synchronizing gear and which is integrally rotated with the second auxiliary gear, and
   a second switching unit which switches between a state in which the third auxiliary gear meshes with one of the first synchronizing gear and the third synchronizing gear, and a state in which the third auxiliary gear does not mesh with one of the first synchronizing gear and the third synchronizing gear.

6. The transmission as recited in claim 5, wherein
   the third auxiliary gear comprises:
   a toothless portion in which teeth are not present a portion of the outer periphery thereof,
   the second switching unit comprises:
   a second key member provided to the third auxiliary gear and an actuator, and
   the second key member is provided protruding from the toothless portion so as to be movable between a protruding position in contact with one of the first synchronizing gear and the third synchronizing gear and a retracted position not in contact with one of the first synchronizing gear and the third synchronizing gear, and the actuator moves the second key member from the retracted position to the protruding position.

7. The transmission as recited in claim 6, wherein
   the second switching unit comprises a guide portion that moves the second key member from the protruding position to the retracted position when the third synchronizing gear is rotated.

8. The transmission as recited in claim 4, wherein
   the first auxiliary gear comprises a toothless portion in which teeth are not present in a portion of the outer periphery of the first auxiliary gear, and
   the first switching unit comprises a first key member provided to the first auxiliary gear and an actuator for operating the first key member, the first key member is provided protruding from the toothless portion so as to be movable between a protruding position in contact with one of the first synchronizing gear and the second synchronizing gear and a retracted position not in contact with one of the first synchronizing gear and the second synchronizing gear, and the actuator moves the first key member from the retracted position to the protruding position.

9. The transmission as recited in claim 8, wherein
   the first switching unit comprises:
   a guide portion that moves the first key member from the protruding position to the retracted position when the first synchronizing gear is rotated.

10. A transmission of a bicycle comprising:
    an input rotating body to which a drive force is inputted;
    a plurality of rotating bodies to which are transmitted rotation of the input rotating body;
    a hollow shaft coaxially provided with the rotating bodies and rotatably supporting the rotating bodies;
    a clutch mechanism including a control shaft disposed inside the hollow shaft and being rotatably arranged relative to the hollow shaft, and configured to switch a coupling state between the rotating bodies and the hollow shaft by rotating the control shaft relative to the hollow shaft; and
    a first shaft separated from the hollow shaft; arid
    an output rotating body, to which is transmitted rotation from the rotating bodies, and which outputs the rotation,
    the input rotating body and the output rotating body being rotatably disposed about an axis of the first shaft,
    the clutch mechanism being configured to rotate the control shaft by transmitting a drive force that is applied to the input rotating body to the control shaft,
    the output rotating body comprising:
       an output gear, and
       the rotating bodies comprise an output side gear which meshes with the output rotating body.

11. The transmission as recited in claim 10, wherein
    at least one of the input gear and the output gear comprises a plurality of gears having different diameters.

12. The transmission as recited in claim 11, wherein the rotating bodies comprise a plurality of input side gears which mesh with each of the plurality of gears of the input gear.

13. The transmission as recited in claim 12, wherein the clutch mechanism further comprises a plurality of engagement portions that are operated by rotation of the control shaft, and that selectively transmit rotation of one of the input side gears to the hollow shaft.

14. The transmission as recited in claim 13, wherein an opening is formed on an outer peripheral portion of the hollow shaft, at least one engagement portion of the engagement portions is disposed in the opening, and the control shaft comprises a control portion for controlling the engagement portion which is disposed in the opening, and switches between a first state in which the engagement portion protrudes from the opening and a second state in which the engagement portion retracts into the opening, by rotating the control shaft with respect to the hollow shaft.

15. The transmission as recited in claim 14, wherein the clutch mechanism further comprises an elastic member for biasing the engagement portion to protrude from the opening.

16. The transmission as recited in claim 11, wherein the rotating bodies comprise a plurality of output side gears which mesh with each of the plurality of gears of the output gear.

17. The transmission as recited in claim 16, wherein the clutch mechanism further comprises a plurality of engagement portions that are operated by rotation of the control shaft, arid that selectively transmit rotation of the hollow shaft to one of the output side gears.

18. The transmission as recited in claim 16, wherein the rotating bodies comprise a plurality of input side gears which mesh with each of the plurality of gears of the input gear; and the clutch mechanism further comprises a plurality of engagement portions that are operated by rotation of the control shaft, that selectively transmit rotation of one of the input side gears to the hollow shaft, and that selectively transmit rotation of the hollow shaft to one of the output side gears.

* * * * *